(12) United States Patent
Garthwaite

(10) Patent No.: US 7,617,264 B1
(45) Date of Patent: Nov. 10, 2009

(54) PARALLEL REMEMBERED-SET PROCESSING RESPECTING POPULAR-OBJECT DETECTION

(75) Inventor: Alexander T. Garthwaite, Beverly, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 571 days.

(21) Appl. No.: 10/824,968

(22) Filed: Apr. 15, 2004

(51) Int. Cl.
*G06F 7/00* (2006.01)
*G06F 17/30* (2006.01)
*G06F 12/00* (2006.01)
*G06F 12/02* (2006.01)

(52) U.S. Cl. .......................... 707/206; 707/2; 707/205; 711/170; 711/132; 716/1

(58) Field of Classification Search ........................ None
See application file for complete search history.

(56) References Cited

U.S. PATENT DOCUMENTS

| | | | |
|---|---|---|---|
| 5,848,423 | A | 12/1998 | Ebrahim et al. |
| 6,148,309 | A | 11/2000 | Azagury et al. |
| 6,148,310 | A | 11/2000 | Azagury et al. |
| 6,173,294 | B1 | 1/2001 | Azagury et al. |
| 6,185,581 | B1 | 2/2001 | Garthwaite |
| 6,415,302 | B1 | 7/2002 | Garthwaite et al. |
| 6,424,977 | B1 | 7/2002 | Garthwaite |
| 6,434,576 | B1 * | 8/2002 | Garthwaite ................. 707/206 |
| 6,434,577 | B1 | 8/2002 | Garthwaite |
| 6,449,626 | B1 | 9/2002 | Garthwaite et al. |
| 6,529,919 | B1 | 3/2003 | Agesen et al. |
| 6,574,720 | B1 | 6/2003 | Hopeman et al. |
| 6,826,583 | B1 | 11/2004 | Flood et al. |
| 6,868,488 | B2 | 3/2005 | Garthwaite |
| 7,058,670 | B2 * | 6/2006 | Garthwaite ................. 707/206 |
| 2002/0095453 | A1 * | 7/2002 | Steensgaard ................. 709/107 |

(Continued)

FOREIGN PATENT DOCUMENTS

WO     0188713     11/2001

(Continued)

OTHER PUBLICATIONS

Jones and Lins, "Garbage Collection: Algorithms for Automatic Dynamic Memory Management", 1996, pp. 167-181, John Wiley and Sons, NY.

(Continued)

*Primary Examiner*—Neveen Abel Jalil
*Assistant Examiner*—Raheem Hoffler
(74) *Attorney, Agent, or Firm*—Osha • Liang LLP

(57) ABSTRACT

A garbage collector that operates in multiple threads divides a generation of a garbage-collected heap into heap sections, with which it associates respective remembered sets of locations where references to objects in those heap sections have been found. When such a heap section comes up for collection, each of a plurality of parallel garbage-collector threads that is processing its remembered set maintains a separate "popularity"—indicating count map, which includes an entry for each of a set of segments into which the collector has divided that heap section. The thread increments an entry in its count map each time it finds a reference to an object in the associated segment. If an object is located in a segment for which the associated count-map entry has exceeded a threshold, the thread evacuates the object in a manner different from that in which it evacuates objects not thus been found to be popular.

17 Claims, 33 Drawing Sheets

U.S. PATENT DOCUMENTS

2003/0212719 A1* 11/2003 Yasuda et al. ............... 707/206
2005/0015417 A1* 1/2005 Lewis ......................... 707/206

OTHER PUBLICATIONS

Ellis, J. R., Li, K., and Appel, A. W., Real-Time Concurrent Collection on Stock Multiprocessors, Systems Research Center, Feb. 14, 1988, pp. 1-20.

Appel, A. W., Simple Generational Garbage Collection and Fast Allocation, Department of Computer Science, Princeton University, 1988, pp. 1-14.

Arora, N. S., Blumofe, R., D., and Plaxton, C., G., Thread Scheduling for Multiprogrammed Multiprocessors, Proceedings of the 10th Annual ACM Symposium on Parallel Algorithms and Architectures, Jun. 1998, pp. 1-23.

Bacon, D., F., et al., Java without the Coffee Breaks: A Nonintrusive Multiprocessor Garbage Collector, Proceedings of the SIGPLAN Conference on Programming Language Design and Implementation, Jun. 2001, pp. 1-11.

Baker, H., G., Jr., List Processing in Real Time on a Serial Computer, Communications of the ACM 21, 4, Apr. 1978, pp. 280-294.

Brooks, R., A., Trading Data Space for Reduced Time and Code Space in Real-Time Garbage Collection on Stock Hardware, Proceedings of the 1984 ACM Symposium on Lisp and Functional Programming, 1984, pp. 256-262.

Cheney, C. J., A Nonrecursive List Compacting Algorithm, Communications of ACM, Nov. 1970, Csambridge, England, pp. 677-678.

Chilimbi, T., M., and Larus, J., R., Using Generational Garbage Collection to Implement Cache-Conscious Data Placement, International Symposium on Management, Oct. 1998, pp. 1-11.

Clark, D., W., An Efficient List-Moving Algorithm Using Constant Workspace, Communications of the ACM, Jun. 1976, vol. 19, No. 6, pp. 352-354.

Clarke, C., L, A., and Mason, D., V., Compacting Garbage Collection can be Fast and Simple, Practice and Experience, vol. 26, No. 2, Feb. 1996, pp. 177-194.

Courts, R., Improving Locality of Reference in a Garbage-Collecting Memory Management System, Communications of the ACM, vol. 31, No. 9, Sep. 1988, pp. 1128-1138.

Goldstein, S., C., Schauser, K., E,. and Culler, D., E., Lazy Threads: Implenting a Fast Parallel Call, Journal of Parallel and Distributed Computing, 1996, pp. 5-20.

Grarup, S. and Seligmann, J., Incremental Mature Garbage Collection, Aug. 1993, pp. 1-189.

Harris, T., L., Dynamic adaptive pre-tenuring, ISMM '00, Minneapolis, MN, 2000, pp. 127-136.

Herlihy, M., P., and Moss, J., E., B., Lock-Free Garbage Collection for Multiprocessors, IEEE Transactions on Parallel and Distributed Systems, vol. 3, No. 3, May 1992, pp. 304-311, presented at ACM SPAA 1991.

Hosking, A., L. And Hudson, R., L., Remembered sets can also play cards, ACM OOPSLA '93 Workshop on Memory Management and Garbage Collection, 1993, pp. 1-7.

Hosking, A., L., Moss, J., E., B., and Stefanovic, D., A Comparative Performance Evaluation of Write Barrier Implementations, ACM Conference on Object-Oriented Programming Systems, Languages, and Applications, Vancouver, Canada, Oct. 1992, pp. 1-14.

Hosking, A., L. and Moss, J., E., B., Protection traps and alternatives for memory management of an object-oriented language, Proceedings of the 14th ACM Symposium on Operating Systems Principles, Dec. 1993, pp. 1-13.

Hudson, R., L. and Moss, J., E., B., Incremental Collection of Mature Objects, Proceedings of the International Workshop on Memory Management, 1992, pp. 1-15.

Hudson, R., L. and Moss, J., E., B., Sapphire: Copying GC Without Stopping the World, Java Grande/ISCOPE, Palo Alto, CA, USA, 2001, pp. 1-10.

Lieberman, H., and Hewitt, C., A Real-Time Garbage Collector Based on the Lifetimes of Objects, Communications of the ACM, 1983, pp. 1-18.

Moon, D., A., Garbage Collection in a Large Lisp System, Communications of the ACM, Austin, Texas, 1984, pp. 235-246.

Nettles, S. and O'Toole, J., Real-Time Replication Garbage Collection, SIGPLAN Conference on Programming Language Design and Implementation, 1993, pp. 217-226.

Sobalvarro, P., G., A Lifetime-based Garbage Collector for LISP Systems on General-Purpose Computers, Department of Electrical Engineering and Computer Science at MIT, Sep. 1988, pp. 1-68.

Stamos, J., W., Static Grouping of Small Objects to Enhance Performance of a Paged Virtual Memory, ACM Transactions on Computer Systems, vol., 2, No. 2, May 1984, pp. 155-180.

Ungar, D., Generation Scavenging: A Non-disruptive High Performance Storage Reclamation Algorithm, ACM Sigplan Notices, 1984, pp. 157-167.

Wilson, P., R., Lam, M., S., and Moher, T., G., Effective "Static-graph" Reorganization to Improve Locality in Garbage-Colleceted Systems, Proceedings of the ACM SIGPLAN '91 Conference on Programming Language design and Implementation, Canada, Jun. 26-28, 1991, pp. 177-191.

Wilson, R, R., Uniprocessor Garbage Collection Techniques, Proceedings of the International Workshop on Memory Management, 1992, pp. 1-32.

Hudson, R. And Diwan, A., Adaptive Garbage Collection for Modula-3 and Smalltalk, OOPSLA/ECOOPp '90, Workshop on Garbage Collection in Object-Oriented Systems, Oct. 27, 1990, pp. 1-5.

Lam, M., S., Wilson, P., R., and Moher, T., G., Object Type Garbage Collection to Improve Locality, Proceedings of the International Workshop on Memory Management, St. Malo, France, 1992, pp. 404-425.

* cited by examiner

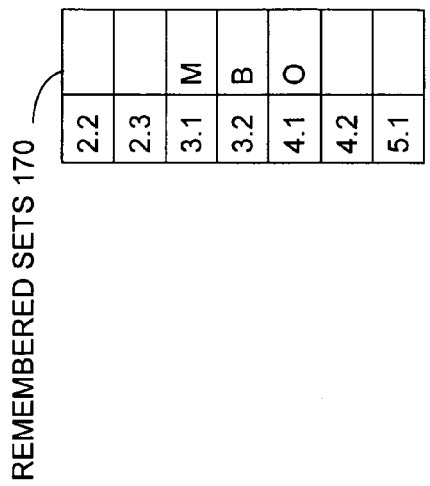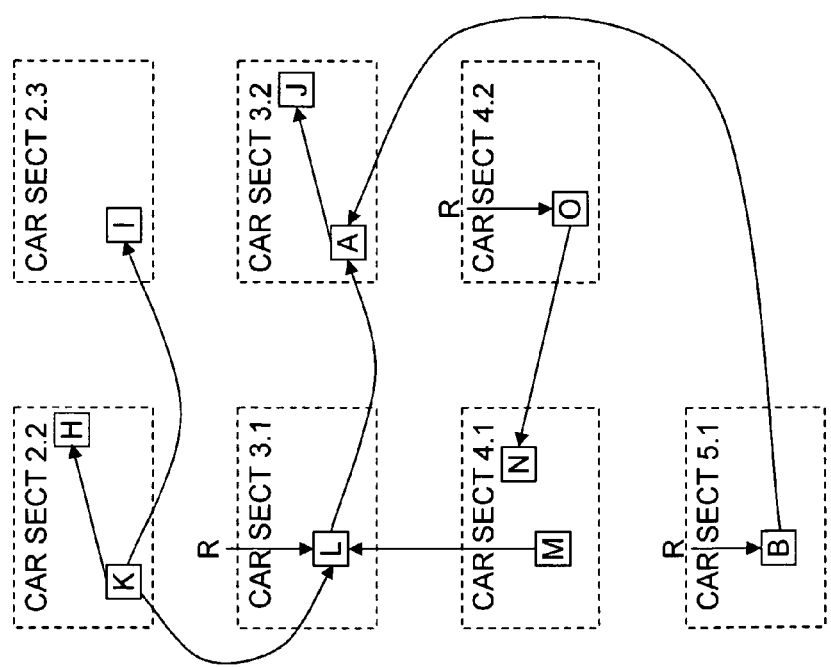
FIG. 12F

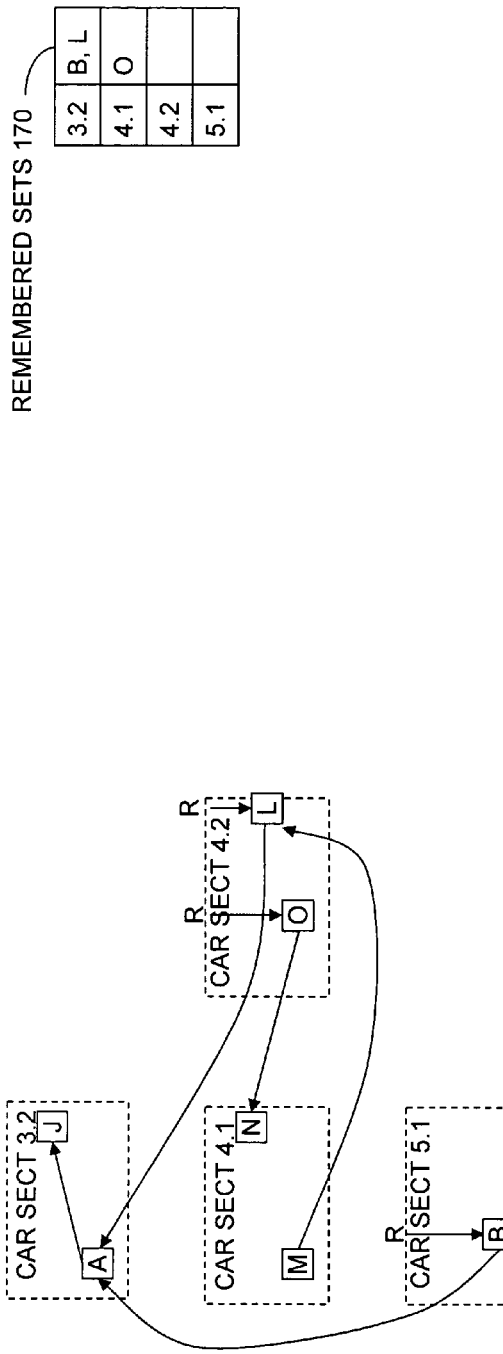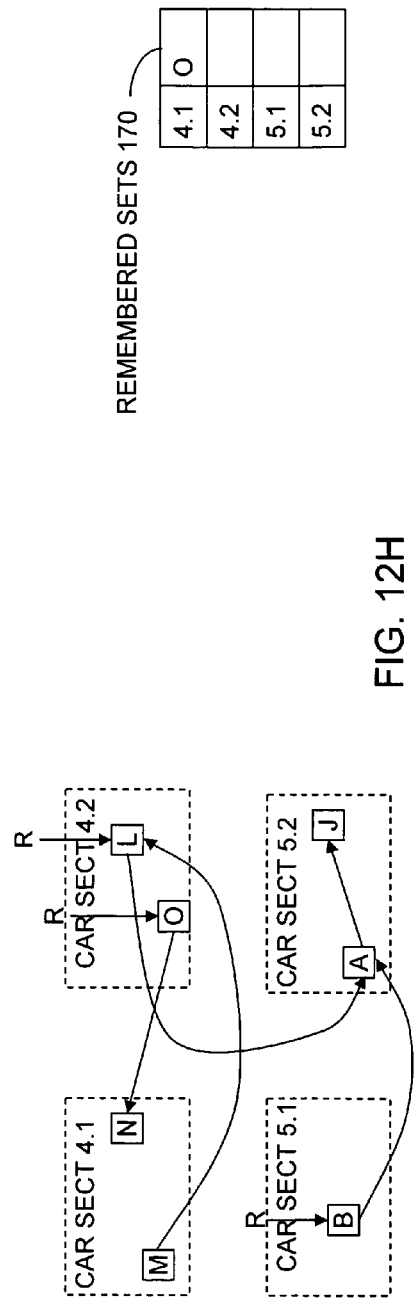
FIG. 12G
FIG. 12H

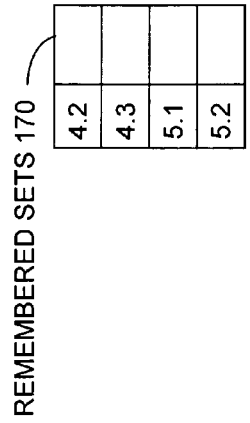
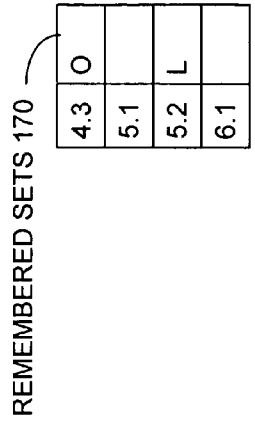
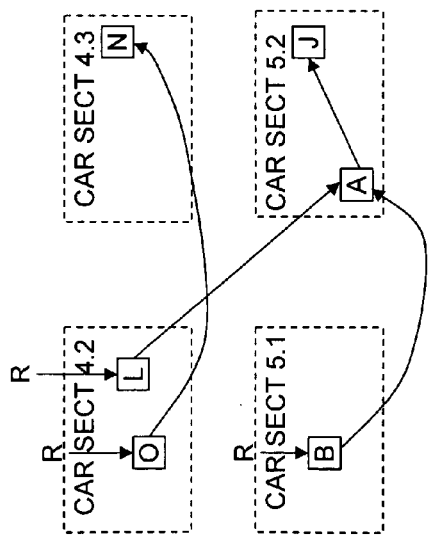
FIG. 12I
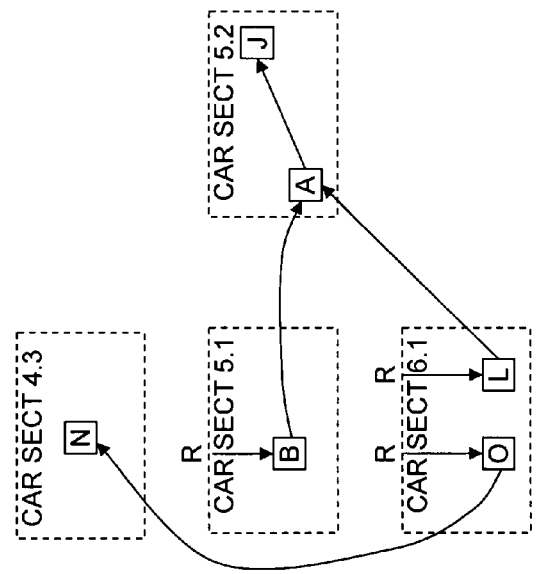
FIG. 12J

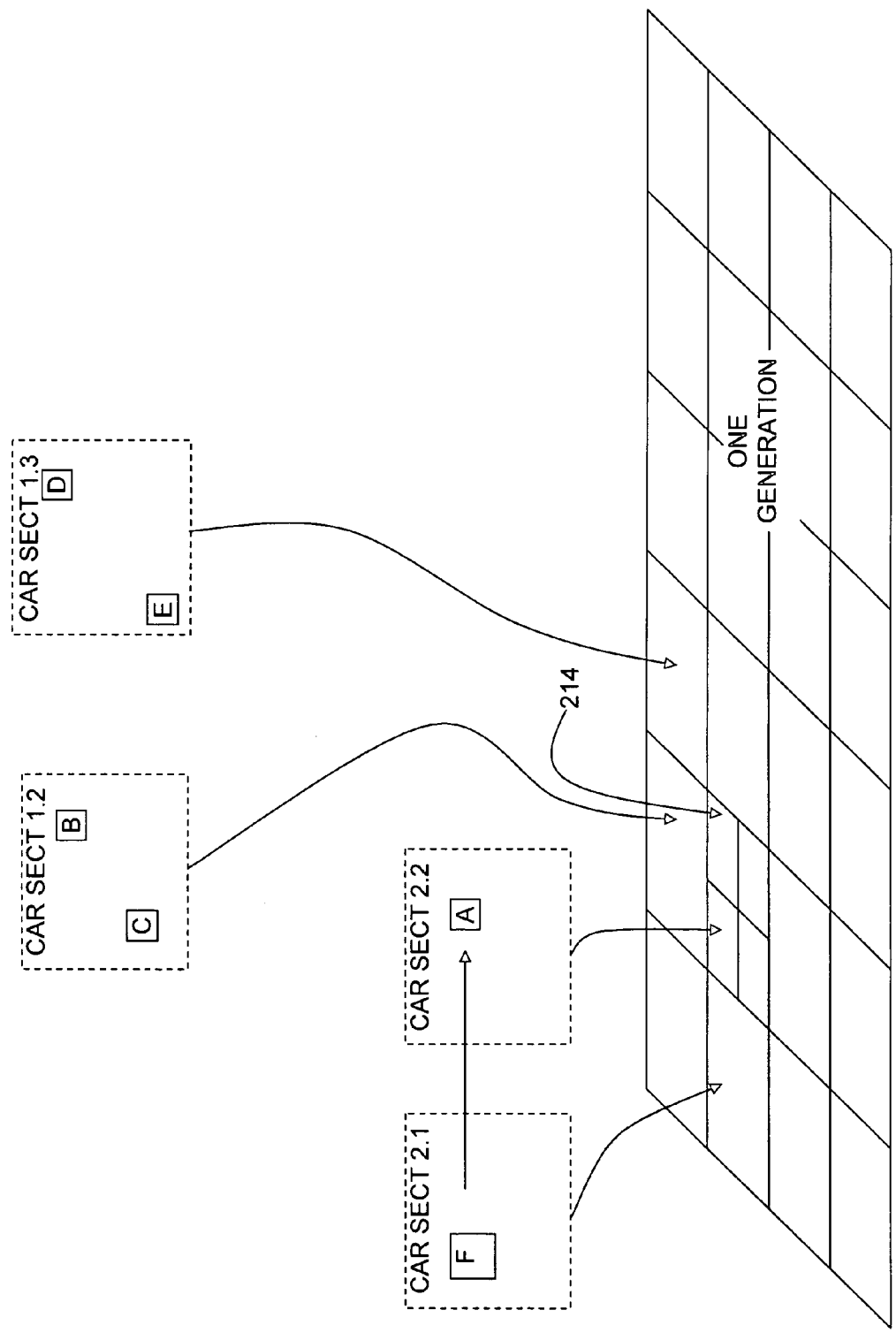

PARALLEL REMEMBERED-SET PROCESSING RESPECTING POPULAR-OBJECT DETECTION

BACKGROUND OF THE INVENTION

1. Field of the Invention

The present invention is directed to memory management. It particularly concerns what has come to be known as "garbage collection."

2. Background Information

In the field of computer systems, considerable effort has been expended on the task of allocating memory to data objects. For the purposes of this discussion, the term object refers to a data structure represented in a computer system's memory. Other terms sometimes used for the same concept are record and structure. An object may be identified by a reference, a relatively small amount of information that can be used to access the object. A reference can be represented as a "pointer" or a "machine address," which may require, for instance, only sixteen, thirty-two, or sixty-four bits of information, although there are other ways to represent a reference.

In some systems, which are usually known as "object oriented," objects may have associated methods, which are routines that can be invoked by reference to the object. They also may belong to a class, which is an organizational entity that may contain method code or other information shared by all objects belonging to that class. In the discussion that follows, though, the term object will not be limited to such structures; it will additionally include structures with which methods and classes are not associated.

The invention to be described below is applicable to systems that allocate memory to objects dynamically. Not all systems employ dynamic allocation. In some computer languages, source programs must be so written that all objects to which the program's variables refer are bound to storage locations at compile time. This storage-allocation approach, sometimes referred to as "static allocation," is the policy traditionally used by the Fortran programming language, for example.

Even for compilers that are thought of as allocating objects only statically, of course, there is often a certain level of abstraction to this binding of objects to storage locations. Consider the typical computer system 10 depicted in FIG. 1, for example. Data, and instructions for operating on them, that a microprocessor 11 uses may reside in on-board cache memory or be received from further cache memory 12, possibly through the mediation of a cache controller 13. That controller 13 can in turn receive such data from system read/write memory ("RAM") 14 through a RAM controller 15 or from various peripheral devices through a system bus 16. The memory space made available to an application program may be "virtual" in the sense that it may actually be considerably larger than RAM 14 provides. So the RAM contents will be swapped to and from a system disk 17.

Additionally, the actual physical operations performed to access some of the most-recently visited parts of the process's address space often will actually be performed in the cache 12 or in a cache on board microprocessor 11 rather than on the RAM 14, with which those caches swap data and instructions just as RAM 14 and system disk 17 do with each other.

A further level of abstraction results from the fact that an application will often be run as one of many processes operating concurrently with the support of an underlying operating system. As part of that system's memory management, the application's memory space may be moved among different actual physical locations many times in order to allow different processes to employ shared physical memory devices. That is, the location specified in the application's machine code may actually result in different physical locations at different times because the operating system adds different offsets to the machine-language-specified location.

Despite these expedients, the use of static memory allocation in writing certain long-lived applications makes it difficult to restrict storage requirements to the available memory space. Abiding by space limitations is easier when the platform provides for dynamic memory allocation, i.e., when memory space to be allocated to a given object is determined only at run time.

Dynamic allocation has a number of advantages, among which is that the run-time system is able to adapt allocation to run-time conditions. For example, the programmer can specify that space should be allocated for a given object only in response to a particular run-time condition. The C-language library function malloc( ) is often used for this purpose. Conversely, the programmer can specify conditions under which memory previously allocated to a given object can be reclaimed for reuse. The C-language library function free( ) results in such memory reclamation.

Because dynamic allocation provides for memory reuse, it facilitates generation of large or long-lived applications, which over the course of their lifetimes may employ objects whose total memory requirements would greatly exceed the available memory resources if they were bound to memory locations statically.

Particularly for long-lived applications, though, allocation and reclamation of dynamic memory must be performed carefully. If the application fails to reclaim unused memory—or, worse, loses track of the address of a dynamically allocated segment of memory—its memory requirements will grow over time to exceed the system's available memory. This kind of error is known as a "memory leak."

Another kind of error occurs when an application reclaims memory for reuse even though it still maintains a reference to that memory. If the reclaimed memory is reallocated for a different purpose, the application may inadvertently manipulate the same memory in multiple inconsistent ways. This kind of error is known as a "dangling reference," because an application should not retain a reference to a memory location once that location is reclaimed. Explicit dynamic-memory management by using interfaces like malloc( )/free( ) often leads to these problems.

A way of reducing the likelihood of such leaks and related errors is to provide memory-space reclamation in a more-automatic manner. Techniques used by systems that reclaim memory space automatically are commonly referred to as "garbage collection." Garbage collectors operate by reclaiming space that they no longer consider "reachable." Statically allocated objects represented by a program's global variables are normally considered reachable throughout a program's life. Such objects are not ordinarily stored in the garbage collector's managed memory space, but they may contain references to dynamically allocated objects that are, and such objects are considered reachable. Clearly, an object referred to in the processor's call stack is reachable, as is an object referred to by register contents. And an object referred to by any reachable object is also reachable.

The use of garbage collectors is advantageous because, whereas a programmer working on a particular sequence of code can perform his task creditably in most respects with only local knowledge of the application at any given time, memory allocation and reclamation require a global knowledge of the program. Specifically, a programmer dealing with a given sequence of code does tend to know whether some portion of memory is still in use for that sequence of code, but it is considerably more difficult for him to know what the rest of the application is doing with that memory. By tracing references from some conservative notion of a "root set," e.g., global variables, registers, and the call stack, automatic garbage collectors obtain global knowledge in a methodical way. By using a garbage collector, the programmer is relieved of the need to worry about the application's global state and can concentrate on local-state issues, which are more manageable. The result is applications that are more robust, having no dangling references and fewer memory leaks.

Garbage-collection mechanisms can be implemented by various parts and levels of a computing system. One approach is simply to provide them as part of a batch compiler's output. Consider FIG. 2's simple batch-compiler operation, for example. A computer system executes in accordance with compiler object code and therefore acts as a compiler 20. The compiler object code is typically stored on a medium such as FIG. 1's system disk 17 or some other machine-readable medium, and it is loaded into RAM 14 to configure the computer system to act as a compiler. In some cases, though, the compiler object code's persistent storage may instead be provided in a server system remote from the machine that performs the compiling.

The input to the compiler is the application source code, and the end product of the compiler process is application object code. This object code defines an application 21, which typically operates on input such as mouse clicks, etc., to generate a display or some other type of output. This object code implements the relationship that the programmer intends to specify by his application source code. In one approach to garbage collection, the compiler 20, without the programmer's explicit direction, additionally generates code that automatically reclaims unreachable memory space.

Even in this simple case, though, there is a sense in which the application does not itself provide the entire garbage collector. Specifically, the application will typically call upon the underlying operating system's memory-allocation functions. And the operating system may in turn take advantage of various hardware that lends itself particularly to use in garbage collection. So even a very simple system may disperse the garbage-collection mechanism over a number of computer-system layers.

To get some sense of the variety of system components that can be used to implement garbage collection, consider FIG. 3's example of a more complex way in which various levels of source code can result in the machine instructions that a processor executes. In the FIG. 3 arrangement, the human applications programmer produces source code 22 written in a high-level language. A compiler 23 typically converts that code into "class files." These files include routines written in instructions, called "byte codes" 24, for a "virtual machine" that various processors can be software-configured to emulate. This conversion into byte codes is almost always separated in time from those codes' execution, so FIG. 3 divides the sequence into a "compile-time environment" 25 separate from a "run-time environment" 26, in which execution occurs. One example of a high-level language for which compilers are available to produce such virtual-machine instructions is the Java™ programming language. (Java is a trademark or registered trademark of Sun Microsystems, Inc., in the United States and other countries.)

Most typically, the class files' byte-code routines are executed by a processor under control of a virtual-machine process 27. That process emulates a virtual machine from whose instruction set the byte codes are drawn. As is true of the compiler 23, the virtual-machine process 27 may be specified by code stored on a local disk or some other machine-readable medium from which it is read into FIG. 1's RAM 14 to configure the computer system to implement the garbage collector and otherwise act as a virtual machine. Again, though, that code's persistent storage may instead be provided by a server system remote from the processor that implements the virtual machine.

In some implementations, much of the virtual machine's action in executing these byte codes is most like what those skilled in the art refer to as "interpreting," so FIG. 3 depicts the virtual machine as including an "interpreter" 28 for that purpose. In addition to or instead of running an interpreter, many virtual-machine implementations actually compile the byte codes concurrently with the resultant object code's execution, so FIG. 3 depicts the virtual machine as additionally including a "just-in-time" compiler 29. The arrangement of FIG. 3 differs from FIG. 2 in that the compiler 23 for converting the human programmer's code does not contribute to providing the garbage-collection function; that results largely from the virtual machine 27's operation.

Those skilled in that art will recognize that both of these organizations are merely exemplary, and many modern systems employ hybrid mechanisms, which partake of the characteristics of traditional compilers and traditional interpreters both. The invention to be described below is applicable independently of whether a batch compiler, a just-in-time compiler, an interpreter, or some hybrid is employed to process source code. In the remainder of this application, therefore, we will use the term compiler to refer to any such mechanism, even if it is what would more typically be called an interpreter.

The arrangement of FIG. 3 differs from FIG. 2 in that the compiler 23 for converting the human programmer's code does not contribute to providing the garbage-collection function; that results largely from the virtual machine 27's operation. Although the FIG. 3 arrangement is a popular one, it is by no means universal, and many further implementation types can be expected. Proposals have even been made to implement the virtual machine 27's behavior in a hardware processor, in which case the hardware itself would provide some or all of the garbage-collection function.

In short, garbage collectors can be implemented in a wide range of combinations of hardware and/or software. As is true of most of the garbage-collection techniques described in the literature, the invention to be described below is applicable to most such systems.

By implementing garbage collection, a computer system can greatly reduce the occurrence of memory leaks and other software deficiencies in which human programming frequently results. But it can also have significant adverse performance effects if it is not implemented carefully. To distinguish the part of the program that does "useful" work from that which does the garbage collection, the term mutator is sometimes used in discussions of these effects; from the collector's point of view, what the mutator does is mutate active data structures' connectivity.

An aspect of the invention to be described below concerns reference counting, which finds many uses in garbage collecting. One use arises in garbage-collection approaches that rely heavily on interleaving garbage-collection steps among mutator steps. In one type of garbage-collection approach, for instance, the mutator operation of writing a reference is followed immediately by garbage-collector steps used to maintain a reference count in that object's header, and code for subsequent new-object storage includes steps for finding space occupied by objects whose reference count has fallen to zero.

But there are other uses for reference counting, too. The specific example in connection with which the present invention's teachings will be explained below is that of accumulating reference counts during a processing of "remembered sets" by a collector that employs the "train algorithm." Most typically, such collectors treat the garbage-collected part of memory as divided into "generations," on not all of which the train algorithm is used. We now turn to a discussion of these concepts to lay the groundwork for the problem that the present invention solves.

In contrast to the simple reference-counting approach just described, collectors that use the train algorithm interleave very few garbage-collector-related instructions into the main mutator process. Instead, they may use separate execution threads to perform some of the garbage-collection work. Or they may interrupt the mutator's operations from time to time for intervals in which they perform most of the garbage-collection operations by which the garbage collector finds unreachable objects and reclaims their memory space for reuse.

The latter approach will be assumed in discussing FIG. 4's depiction of a simple garbage-collection operation. Within the memory space allocated to a given application is a part 40 managed by automatic garbage collection. In the following discussion, this will be referred to as the "heap," although in other contexts that term refers to all dynamically allocated memory. During the course of the application's execution, space is allocated for various objects 42, 44, 46, 48, and 50. Typically, the mutator allocates space within the heap by invoking the garbage collector, which at some level manages access to the heap. Basically, the mutator asks the garbage collector for a pointer to a heap region where it can safely place the object's data. The garbage collector keeps track of the fact that the thus-allocated region is occupied. It will refrain from allocating that region in response to any other request until it determines that the mutator no longer needs the region allocated to that object.

Garbage collectors vary as to which objects they consider reachable and unreachable. For the present discussion, though, an object will be considered "reachable" if it is referred to, as object 42 is, by a reference in the root set 52. The root set consists of reference values stored in the mutator's threads' call stacks, the CPU registers, and global variables outside the garbage-collected heap. An object is also reachable if it is referred to, as object 46 is, by another reachable object (in this case, object 42). Objects that are not reachable can no longer affect the program, so it is safe to re-allocate the memory spaces that they occupy.

A typical approach to garbage collection is therefore to identify all reachable objects and reclaim any previously allocated memory that the reachable objects do not occupy. A typical garbage collector may identify reachable objects by tracing references from the root set 52. For the sake of simplicity, FIG. 4 depicts only one reference from the root set 52 into the heap 40. (Those skilled in the art will recognize that there are many ways to identify references, or at least data contents that may be references.) The collector notes that the root set points to object 42, which is therefore reachable, and that reachable object 42 points to object 46, which therefore is also reachable. But those reachable objects point to no other objects, so objects 44, 48, and 50 are all unreachable, and their memory space may be reclaimed. This may involve, say, placing that memory space in a list of free memory blocks.

To avoid excessive heap fragmentation, some garbage collectors additionally relocate reachable objects. FIG. 5 shows a typical approach. The heap is partitioned into two halves, hereafter called "semi-spaces." For one garbage-collection cycle, all objects are allocated in one semi-space 54, leaving the other semi-space 56 free. When the garbage-collection cycle occurs, objects identified as reachable are "evacuated" to the other semi-space 56, so all of semi-space 54 is then considered free. Once the garbage-collection cycle has occurred, all new objects are allocated in the lower semi-space 56 until yet another garbage-collection cycle occurs, at which time the reachable objects are evacuated back to the upper semi-space 54.

Although this relocation requires the extra steps of copying the reachable objects and updating references to them, it tends to be quite efficient, since most new objects quickly become unreachable, so most of the current semi-space is actually garbage. That is, only a relatively few, reachable objects need to be relocated, after which the entire semi-space contains only garbage and can be pronounced free for reallocation.

Now, a collection cycle can involve following all reference chains from the basic root set—i.e., from inherently reachable locations such as the call stacks, class statics and other global variables, and registers—and reclaiming all space occupied by objects not encountered in the process. And the simplest way of performing such a cycle is to interrupt the mutator to provide a collector interval in which the entire cycle is performed before the mutator resumes. For certain types of applications, this approach to collection-cycle scheduling is acceptable and, in fact, highly efficient.

For many interactive and real-time applications, though, this approach is not acceptable. The delay in mutator operation that the collection cycle's execution causes can be annoying to a user and can prevent a real-time application from responding to its environment with the required speed. In some applications, choosing collection times opportunistically can reduce this effect. Collection intervals can be inserted when an interactive mutator reaches a point at which it awaits user input, for instance.

So it may often be true that the garbage-collection operation's effect on performance can depend less on the total collection time than on when collections actually occur. But another factor that often is even more determinative is the duration of any single collection interval, i.e., how long the mutator must remain quiescent at any one time. In an interactive system, for instance, a user may never notice hundred-millisecond interruptions for garbage collection, whereas most users would find interruptions lasting for two seconds to be annoying.

The cycle may therefore be divided up among a plurality of collector intervals. When a collection cycle is divided up among a plurality of collection intervals, it is only after a number of intervals that the collector will have followed all reference chains and be able to identify as garbage any objects not thereby reached. This approach is more complex than completing the cycle in a single collection interval; the mutator will usually modify references between collection intervals, so the collector must repeatedly update its view of the reference graph in the midst of the collection cycle. To make such updates practical, the mutator must communicate with the collector to let it know what reference changes are made between intervals.

An even more complex approach, which some systems use to eliminate discrete pauses or maximize resource-use efficiency, is to execute the mutator and collector in concurrent execution threads. Most systems that use this approach use it for most but not all of the collection cycle; the mutator is usually interrupted for a short collector interval, in which a part of the collector cycle takes place without mutation.

Independent of whether the collection cycle is performed concurrently with mutator operation, is completed in a single interval, or extends over multiple intervals is the question of whether the cycle is complete, as has tacitly been assumed so far, or is instead "incremental." In incremental collection, a collection cycle constitutes only an increment of collection: the collector does not follow all reference chains from the basic root set completely. Instead, it concentrates on only a portion, or collection set, of the heap. Specifically, it identifies every collection-set object referred to by a reference chain that extends into the collection set from outside of it, and it reclaims the collection-set space not occupied by such objects, possibly after evacuating them from the collection set.

By thus culling objects referenced by reference chains that do not necessarily originate in the basic root set, the collector can be thought of as expanding the root set to include as roots some locations that may not be reachable. Although incremental collection thereby leaves "floating garbage," it can result in relatively low pause times even if entire collection increments are completed during respective single collection intervals.

Most collectors that employ incremental collection operate in "generations," although this is not necessary in principle. Different portions, or generations, of the heap are subject to different collection policies. New objects are allocated in a "young" generation, and older objects are promoted from younger generations to older or more "mature" generations. Collecting the younger generations more frequently than the others yields greater efficiency because the younger generations tend to accumulate garbage faster; newly allocated objects tend to "die," while older objects tend to "survive."

But generational collection greatly increases what is effectively the root set for a given generation. Consider FIG. 6, which depicts a heap as organized into three generations 58, 60, and 62. Assume that generation 60 is to be collected. The process for this individual generation may be more or less the same as that described in connection with FIGS. 4 and 5 for the entire heap, with one major exception. In the case of a single generation, the root set must be considered to include not only the call stack, registers, and global variables represented by set 52 but also objects in the other generations 58 and 62, which themselves may contain references to objects in generation 60. So pointers must be traced not only from the basic root set 52 but also from objects within the other generations.

One could perform this tracing by simply inspecting all references in all other generations at the beginning of every collection interval, and it turns out that this approach is actually feasible in some situations. But it takes too long in other situations, so workers in this field have employed a number of approaches to expediting reference tracing. One approach is to include so-called write barriers in the mutator process. A write barrier is code added to a write operation to record information from which the collector can determine where references were written or may have been since the last collection interval. A reference list can then be maintained by taking such a list as it existed at the end of the previous collection interval and updating it by inspecting only locations identified by the write barrier as possibly modified since the last collection interval.

One of the many write-barrier implementations commonly used by workers in this art employs what has been referred to as the "card table." FIG. 6 depicts the various generations as being divided into smaller sections, known for this purpose as "cards." Card tables 64, 66, and 68 associated with respective generations contain an entry for each of their cards. When the mutator writes a reference in a card, it makes an appropriate entry in the card-table location associated with that card (or, say, with the card in which the object containing the reference begins). Most write-barrier implementations simply make a Boolean entry indicating that the write operation has been performed, although some may be more elaborate. The mutator having thus left a record of where new or modified references may be, the collector can thereafter prepare appropriate summaries of that information, as will be explained in due course. For the sake of concreteness, we will assume that the summaries are maintained by steps that occur principally at the beginning of each collection interval.

Of course, there are other write-barrier approaches, such as simply having the write barrier add to a list of addresses where references where written. Also, although there is no reason in principle to favor any particular number of generations, and although FIG. 6 shows three, most generational garbage collectors have only two generations, of which one is the young generation and the other is the mature generation. Moreover, although FIG. 6 shows the generations as being of the same size, a more-typical configuration is for the young generation to be considerably smaller. Finally, although we assumed for the sake of simplicity that collection during a given interval was limited to only one generation, a more-typical approach is actually to collect the whole young generation at every interval but to collect the mature one less frequently.

Some collectors collect the entire young generation in every interval and may thereafter perform mature-generation collection in the same interval. It may therefore take relatively little time to scan all young-generation objects remaining after young-generation collection to find references into the mature generation. Even when such collectors do use card tables, therefore, they often do not use them for finding young-generation references that refer to mature-generation objects. On the other hand, laboriously scanning the entire mature generation for references to young-generation (or mature-generation) objects would ordinarily take too long, so the collector uses the card table to limit the amount of memory it searches for mature-generation references.

Now, although it typically takes very little time to collect the young generation, it may take more time than is acceptable within a single garbage-collection cycle to collect the entire mature generation. So some garbage collectors may collect the mature generation incrementally; that is, they may perform only a part of the mature generation's collection during any particular collection cycle. Incremental collection presents the problem that, since the generation's unreachable objects outside the "collection set" of objects processed during that cycle cannot be recognized as unreachable, collection-set objects to which they refer tend not to be, either.

To reduce the adverse effect this would otherwise have on collection efficiency, workers in this field have employed the "train algorithm," which FIG. 7 depicts. A generation to be collected incrementally is divided into sections, which for reasons about to be described are referred to as "car sections." Conventionally, a generation's incremental collection occurs in fixed-size sections, and a car section's size is that of the generation portion to be collected during one cycle.

The discussion that follows will occasionally employ the nomenclature in the literature by using the term car instead of car section. But the literature seems to use that term to refer variously not only to memory sections themselves but also to data structures that the train algorithm employs to manage them when they contain objects, as well as to the more-abstract concept that the car section and managing data structure represent in discussions of the algorithm. So the following discussion will more frequently use the expression car section to emphasize the actual sections of memory space for whose management the car concept is employed.

According to the train algorithm, the car sections are grouped into "trains," which are ordered, conventionally according to age. For example, FIG. 7 shows an oldest train 73 consisting of a generation 74's three car sections described by associated data structures 75, 76, and 78, while a second train 80 consists only of a single car section, represented by structure 82, and the youngest train 84 (referred to as the "allocation train") consists of car sections that data structures 86 and 88 represent. As will be seen below, car sections' train memberships can change, and any car section added to a train is typically added to the end of a train.

Conventionally, the car collected in an increment is the one added earliest to the oldest train, which in this case is car 75. All of the generation's cars can thus be thought of as waiting for collection in a single long line, in which cars are ordered in accordance with the order of the trains to which they belong and, within trains, in accordance with the order in which they were added to those trains.

As is usual, the way in which reachable objects are identified is to determine whether there are references to them in the root set or in any other object already determined to be reachable. In accordance with the train algorithm, the collector additionally performs a test to determine whether there are any references at all from outside the oldest train to objects within it. If there are not, then all cars within the train can be reclaimed, even though not all of those cars are in the collection set. And the train algorithm so operates that inter-car references tend to be grouped into trains, as will now be explained.

To identify references into the car from outside of it, train-algorithm implementations typically employ "remembered sets." As card tables are, remembered sets are used to keep track of references. Whereas a card-table entry contains information about references that the associated card contains, though, a remembered set associated with a given heap section contains information about references into that section from locations outside of it. In the case of the train algorithm, remembered sets are associated with car sections. Each remembered set, such as car 75's remembered set 90, lists locations in the generation that contain references into the associated car section.

The remembered sets for all of a generation's cars are typically updated at the start of each collection cycle. To illustrate how such updating and other collection operations may be carried out, FIGS. 8A and 8B (together, "FIG. 8") depict an operational sequence in a system of the typical type mention above. That is, it shows a sequence of operations that may occur in a system in which the entire garbage-collected heap is divided into two generations, namely, a young generation and an old generation, and in which the young generation is much smaller than the old generation. FIG. 8 is also based on the assumption and that the train algorithm is used only for collecting the old generation.

Block 102 represents a period of the mutator's operation. As was explained above, the mutator makes a card-table entry to identify any card that it has "dirtied" by adding or modifying a reference that the card contains. At some point, the mutator will be interrupted for collector operation. Different implementations employ different events to trigger such an interruption, but we will assume for the sake of concreteness that the system's dynamic-allocation routine causes such interruptions when no room is left in the young generation for any further allocation. A dashed line 103 represents the transition from mutator operation and collector operation.

In the system assumed for the FIG. 8 example, the collector collects the (entire) young generation each time such an interruption occurs. When the young generation's collection ends, the mutator operation usually resumes, without the collector's having collected any part of the old generation. Once in a while, though, the collector also collects part of the old generation, and FIG. 8 is intended to illustrate such an occasion.

When the collector's interval first starts, it first processes the card table, in an operation that block 104 represents. As was mentioned above, the collector scans the "dirtied" cards for references into the young generation. If a reference is found, that fact is memorialized appropriately. If the reference refers to a young-generation object, for example, an expanded card table may be used for this purpose. For each card, such an expanded card table might include a multi-byte array used to summarize the card's reference contents. The summary may, for instance, be a list of offsets that indicate the exact locations within the card of references to young-generation objects, or it may be a list of fine-granularity "sub-cards" within which references to young-generation objects may be found. If the reference refers to an old-generation object, the collector often adds an entry to the remembered set associated with the car containing that old-generation object. The entry identifies the reference's location, or at least a small region in which the reference can be found. For reasons that will become apparent, though, the collector will typically not bother to place in the remembered set the locations of references from objects in car sections farther forward in the collection queue than the referred-to object, i.e., from objects in older trains or in cars added earlier to the same train.

The collector then collects the young generation, as block 105 indicates. (Actually, young-generation collection may be interleaved with the dirty-region scanning, but the drawing illustrates it for purpose of explanation as being separate.) If a young-generation object is referred to by a reference that card-table scanning has revealed, that object is considered to be potentially reachable, as is any young-generation object referred to by a reference in the root set or in another reachable young-generation object. The space occupied by any young-generation object thus considered reachable is withheld from reclamation. For example, it may be evacuated to a young-generation semi-space that will be used for allocation during the next mutator interval. It may instead be promoted into the older generation, where it is placed into a car containing a reference to it or into a car in the last train. Or some other technique may be used to keep the memory space it occupies off the system's free list. The collector then reclaims any young-generation space occupied by any other objects, i.e., by any young-generation objects not identified as transitively reachable through references located outside the young generation.

The collector then performs the train algorithm's central test, referred to above, of determining whether there are any references into the oldest train from outside of it. As was mentioned above, the actual process of determining, for each object, whether it can be identified as unreachable is performed for only a single car section in any cycle. In the absence of features such as those provided by the train algorithm, this would present a problem, because garbage structures may be larger than a car section. Objects in such structures would therefore (erroneously) appear reachable, since they are referred to from outside the car section under consideration. But the train algorithm additionally keeps track of whether there are any references into a given car from outside the train to which it belongs, and trains' sizes are not limited. As will be apparent presently, objects not found to be unreachable are relocated in such a way that garbage structures tend to be gathered into respective trains into which, eventually, no references from outside the train point. If no references from outside the train point to any objects inside the train, the train can be recognized as containing only garbage. This is the test that block 106 represents. All cars in a train thus identified as containing only garbage can be reclaimed.

The question of whether old-generation references point into the train from outside of it is (conservatively) answered in the course of updating remembered sets; in the course of updating a car's remembered set, it is a simple matter to flag the car as being referred to from outside the train. The step-106 test additionally involves determining whether any references from outside the old generation point into the oldest train. Various approaches to making this determination have been suggested, including the conceptually simple approach of merely following all reference chains from the root set until those chains (1) terminate, (2) reach an old-generation object outside the oldest train, or (3) reach an object in the oldest train. In the two-generation example, most of this work can be done readily by identifying references into the collection set from live young-generation objects during the young-generation collection. If one or more such chains reach the oldest train, that train includes reachable objects. It may also include reachable objects if the remembered-set-update operation has found one or more references into the oldest train from outside of it. Otherwise, that train contains only garbage, and the collector reclaims all of its car sections for reuse, as block 107 indicates. The collector may then return control to the mutator, which resumes execution, as FIG. 8B's block 108 indicates.

If the train contains reachable objects, on the other hand, the collector turns to evacuating potentially reachable objects from the collection set. The first operation, which block 110 represents, is to remove from the collection set any object that is reachable from the root set by way of a reference chain that does not pass through the part of the old generation that is outside of the collection set. In the illustrated arrangement, in which there are only two generations, and the young generation has previously been completely collected during the same interval, this means evacuating from a collection set any object that (1) is directly referred to by a reference in the root set, (2) is directly referred to by a reference in the young generation (in which no remaining objects have been found unreachable), or (3) is referred to by any reference in an object thereby evacuated. All of the objects thus evacuated are placed in cars in the youngest train, which was newly created during the collection cycle. Certain of the mechanics involved in the evacuation process are described in more detail in connection with similar evacuation performed, as blocks 112 and 114 indicate, in response to remembered-set entries.

FIG. 9 illustrates how the processing represented by block 114 proceeds. The entries identify heap regions, and, as block 116 indicates, the collector scans the thus-identified heap regions to find references to locations in the collection-set. As blocks 118 and 120 indicate, that entry's processing continues until the collector finds no more such references. Every time the collector does find such a reference, it checks to determine whether, as a result of a previous entry's processing, the referred-to object has already been evacuated. If it has not, the collector evacuates the referred-to object to a (possibly new) car in the train containing the reference, as blocks 122 and 124 indicate.

As FIG. 10 indicates, the evacuation operation includes more than just object relocation, which block 126 represents. Once the object has been moved, the collector places a forwarding pointer in the collection-set location from which it was evacuated, for a purpose that will become apparent presently. Block 128 represents that step. (Actually, there are some cases in which the evacuation is only a "logical" evacuation: the car containing the object is simply re-linked to a different logical place in the collection sequence, but its address does not change. In such cases, forwarding pointers are unnecessary.) Additionally, the reference in response to which the object was evacuated is updated to point to the evacuated object's new location, as block 130 indicates. And, as block 132 indicates, any reference contained in the evacuated object is processed, in an operation that FIGS. 11A and 11B (together, "FIG. 11") depict.

For each one of the evacuated object's references, the collector checks to see whether the location that it refers to is in the collection set. As blocks 134 and 136 indicate, the reference processing continues until all references in the evacuated object have been processed. In the meantime, if a reference refers to a collection-set location that contains an object not yet evacuated, the collector evacuates the referred-to object to the train to which the evacuated object containing the reference was evacuated, as blocks 138 and 140 indicate.

If the reference refers to a location in the collection set from which the object has already been evacuated, then the collector uses the forwarding pointer left in that location to update the reference, as block 142 indicates. Before the processing of FIG. 11, the remembered set of the referred-to object's car will have an entry that identifies the evacuated object's old location as one containing a reference to the referred-to object. But the evacuation has placed the reference in a new location, for which the remembered set of the referred-to object's car may not have an entry. So, if that new location is not as far forward as the referred-to object, the collector adds to that remembered set an entry identifying the reference's new region, as blocks 144 and 146 indicate. As the drawings show, the same type of remembered-set update is performed if the object referred to by the evacuated reference is not in the collection set.

Now, some train-algorithm implementations postpone processing of the references contained in evacuated collection-set objects until after all directly reachable collection-set objects have been evacuated. In the implementation that FIG. 10 illustrates, though, the processing of a given evacuated object's references occurs before the next object is evacuated. So FIG. 11's blocks 134 and 148 indicate that the FIG. 11 operation is completed when all of the references contained in the evacuated object have been processed. This completes FIG. 10's object-evacuation operation, which FIG. 9's block 124 represents.

As FIG. 9 indicates, each collection-set object referred to by a reference in a remembered-set-entry-identified location is thus evacuated if it has not been already. If the object has already been evacuated from the referred-to location, the reference to that location is updated to point to the location to which the object has been evacuated. If the remembered set associated with the car containing the evacuated object's new location does not include an entry for the reference's location, it is updated to do so if the car containing the reference is younger than the car containing the evacuated object. Block 150 represents updating the reference and, if necessary, the remembered set.

As FIG. 8's blocks 112 and 114 indicate, this processing of collection-set remembered sets is performed initially only for entries that do not refer to locations in the oldest train. Those that do are processed only after all others have been, as blocks 152 and 154 indicate.

When this process has been completed, the collection set's memory space can be reclaimed, as block 164 indicates, since no remaining object is referred to from outside the collection set: any remaining collection-set object is unreachable. The collector then relinquishes control to the mutator.

FIGS. 12A-12J illustrate results of using the train algorithm. FIG. 12A represents a generation in which objects have been allocated in nine car sections. The oldest train has four cars, numbered 1.1 through 1.4. Car 1.1 has two objects, A and B. There is a reference to object B in the root set (which, as was explained above, includes live objects in the other generations). Object A is referred to by object L, which is in the third train's sole car section. In the generation's remembered sets 170, a reference in object L has therefore been recorded against car 1.1.

Processing always starts with the oldest train's earliest-added car, so the garbage collector refers to car 1.1's remembered set and finds that there is a reference from object L into the car being processed. It accordingly evacuates object A to the train that object L occupies. The object being evacuated is often placed in one of the selected train's existing cars, but we will assume for present purposes that there is not enough room. So the garbage collector evacuates object A into a new car section and updates appropriate data structures to identify it as the next car in the third train. FIG. 12B depicts the result: a new car has been added to the third train, and object A is placed in it.

FIG. 12B also shows that object B has been evacuated to a new car outside the first train. This is because object B has an external reference, which, like the reference to object A, is a reference from outside the first train, and one goal of the processing is to form trains into which there are no further references. Note that, to maintain a reference to the same object, object L's reference to object A has had to be rewritten, and so have object B's reference to object A and the inter-generational pointer to object B. In the illustrated example, the garbage collector begins a new train for the car into which object B is evacuated, but this is not a necessary requirement of the train algorithm. That algorithm requires only that externally referenced objects be evacuated to a newer train.

Since car 1.1 no longer contains live objects, it can be reclaimed, as FIG. 12B also indicates. Also note that the remembered set for car 2.1 now includes the address of a reference in object A, whereas it did not before. As was stated before, remembered sets in the illustrated embodiment include only references from cars further back in the order than the one with which the remembered set is associated. The reason for this is that any other cars will already be reclaimed by the time the car associated with that remembered set is processed, so there is no reason to keep track of references from them.

The next step is to process the next car, the one whose index is 1.2. Conventionally, this would not occur until some collection cycle after the one during which car 1.1 is collected. For the sake of simplicity we will assume that the mutator has not changed any references into the generation in the interim.

FIG. 12B depicts car 1.2 as containing only a single object, object C, and that car's remembered set contains the address of an inter-car reference from object F. The garbage collector follows that reference to object C. Since this identifies object C as possibly reachable, the garbage collector evacuates it from car set 1.2, which is to be reclaimed. Specifically, the garbage collector removes object C to a new car section, section 1.5, which is linked to the train to which the referring object F's car belongs. Of course, object F's reference needs to be updated to object C's new location. FIG. 12C depicts the evacuation's result.

FIG. 12C also indicates that car set 1.2 has been reclaimed, and car 1.3 is next to be processed. The only address in car 1.3's remembered set is that of a reference in object G. Inspection of that reference reveals that it refers to object F. Object F may therefore be reachable, so it must be evacuated before car section 1.3 is reclaimed. On the other hand, there are no references to objects D and E, so they are clearly garbage. FIG. 12D depicts the result of reclaiming car 1.3's space after evacuating possibly reachable object F.

In the state that FIG. 12D depicts, car 1.4 is next to be processed, and its remembered set contains the addresses of references in objects K and C. Inspection of object K's reference reveals that it refers to object H, so object H must be evacuated. Inspection of the other remembered-set entry, the reference in object C, reveals that it refers to object G, so that object is evacuated, too. As FIG. 12E illustrates, object H must be added to the second train, to which its referring object K belongs. In this case there is room enough in car 2.2, which its referring object K occupies, so evacuation of object H does not require that object K's reference to object H be added to car 2.2's remembered set. Object G is evacuated to a new car in the same train, since that train is where referring object C resides. And the address of the reference in object G to object C is added to car 1.5's remembered set.

FIG. 12E shows that this processing has eliminated all references into the first train, and it is an important part of the train algorithm to test for this condition. That is, even though there are references into both of the train's cars, those cars' contents can be recognized as all garbage because there are no references into the train from outside of it. So all of the first train's cars are reclaimed.

The collector accordingly processes car 2.1 during the next collection cycle, and that car's remembered set indicates that there are two references outside the car that refer to objects within it. Those references are in object K, which is in the same train, and object A, which is not. Inspection of those references reveals that they refer to objects I and J, which are evacuated.

The result, depicted in FIG. 12F, is that the remembered sets for the cars in the second train reveal no inter-car references, and there are no inter-generational references into it, either. That train's car sections therefore contain only garbage, and their memory space can be reclaimed.

So car 3.1 is processed next. Its sole object, object L, is referred to inter-generationally as well as by a reference in the fourth train's object M. As FIG. 12G shows, object L is therefore evacuated to the fourth train. And the address of the reference in object L to object A is placed in the remembered set associated with car 3.2, in which object A resides.

The next car to be processed is car 3.2, whose remembered set includes the addresses of references into it from objects B and L. Inspection of the reference from object B reveals that it refers to object A, which must therefore be evacuated to the fifth train before car 3.2 can be reclaimed. Also, we assume that object A cannot fit in car section 5.1, so a new car 5.2 is added to that train, as FIG. 12H shows, and object A is placed in its car section. All referred-to objects in the third train having been evacuated, that (single-car) train can be reclaimed in its entirety.

A further observation needs to be made before we leave FIG. 12G. Car 3.2's remembered set additionally lists a reference in object L, so the garbage collector inspects that reference and finds that it points to the location previously occupied by object A. This brings up a feature of copying-collection techniques such as the typical train-algorithm implementation. When the garbage collector evacuates an object from a car section, it marks the location as having been evacuated and leaves the address of the object's new location. So, when the garbage collector traces the reference from object L, it finds that object A has been removed, and it accordingly copies the new location into object L as the new value of its reference to object A.

In the state that FIG. 12H illustrates, car 4.1 is the next to be processed. Inspection of the fourth train's remembered sets reveals no inter-train references into it, but the inter-generational scan (possibly performed with the aid of FIG. 6's card tables) reveals inter-generational references into car 4.2. So the fourth train cannot be reclaimed yet. The garbage collector accordingly evacuates car 4.1's referred-to objects in the normal manner, with the result that FIG. 12I depicts.

In that state, the next car to be processed has only inter-generational references into it. So, although its referred-to objects must therefore be evacuated from the train, they cannot be placed into trains that contain references to them. Conventionally, such objects are evacuated to a train at the end of the train sequence. In the illustrated implementation, a new train is formed for this purpose, so the result of car 4.2's processing is the state that FIG. 12J depicts.

Processing continues in this same fashion. Of course, subsequent collection cycles will not in general proceed, as in the illustrated cycles, without any reference changes by the mutator and without any addition of further objects. But reflection reveals that the general approach just described still applies when such mutations occur.

As described so far, the train algorithm (as many other garbage-collection approaches do) performs garbage collection without any significant amount of reference counting to identify unreachable objects. But such garbage-collection approaches may nonetheless have occasion to perform reference counting. One such occasion arises in employing the technique described in U.S. Pat. No. 6,434,576 to Alexander T. Garthwaite for Popular-Object Handling in a Train-Algorithm Based Garbage Collector ("the '576 patent"). That patent deals with one of the problems posed by so-called popular objects, i.e., by objects to which a large number of references refer. To understand this problem and the way in which that patent deals with it, consider FIG. 12F.

FIG. 12F shows that there are two references to object L after the second train is collected. So references in both of the referring objects need to be updated when object L is evacuated. If entry duplication is to be avoided, adding remembered-set entries is burdensome. Still, the burden in not too great in that example, since only two referring objects are involved. But some types of applications routinely generate objects to which there are large numbers of references. Evacuating a single one of these objects requires considerable reference updating, so it can be quite costly.

One way of dealing with this problem is to place popular objects in their own cars. To understand how this can be done, consider FIG. 13's exemplary data structures, which represent some of the types of information a collector may maintain in support of the train algorithm. To emphasize trains' ordered nature, FIG. 14 depicts such a structure 160 as including pointers 162 and 164 to the previous and next trains, although train order could obviously be maintained without such a mechanism. Cars are ordered within trains, too, and it may be a convenient to assign numbers for this purpose explicitly and keep the next number to be assigned in the train-associated structure, as field 166 suggests. In any event, some way of associating cars with trains is necessary, and the drawing represents this by fields 166 and 168 that point to structures containing data for the train's first and last cars.

FIG. 13 depicts one such structure 170 as including pointers 172, 174, and 176 to structures that contain information concerning the train to which the car belongs, the previous car in the train, and the next car in the train. Further pointers 178 and 180 point to the locations in the heap at which the associated car section begins and ends, whereas pointer 182 points to the place at which the next object can be added to the car section.

As will be explained in more detail presently, there is a standard car-section size that is used for all cars that contain more than one object, and that size is great enough to contain a relatively large number of average-sized objects. But some objects can be too big for the standard size, so a car section may consist of more than one of the standard-size memory sections. Structure 170 therefore includes a field 184 that indicates how many standard-size memory sections there are in the car section that the structure manages.

On the other hand, that structure may in the illustrated embodiment be associated not with a single car section but rather with a standard-car-section-sized memory section that contains more than one (special-size) car section. When an organization of this type is used, structures like structure 170 may include a field 186 that indicates whether the heap space associated with the structure is used (1) normally, as a car section that can contain multiple objects, or (2) specially, as a region in which objects are stored one to a car in a manner that will now be explained by reference to the additional structures that FIG. 14 illustrates.

To deal specially with popular objects, the '576 patent mentioned above describes keeping a reference count for each object in a car section currently being collected. Now, the memory space 188 allocated to an object typically begins with a header 190 that contains various housekeeping information, such as an identifier of the class to which the object belongs. In particular, the '576 patent describes including a reference-count field 192 in the object's header. That field's default value is zero, and this is its value at the beginning of a collection increment. As the garbage collector processes a collection-set car's remembered set, it increments the object's reference-count field each time it finds a reference to that object, and it tests the resultant value to determine whether the count exceeds a predetermined popular-object threshold. If the count does exceed the threshold, the collector removes the object to a "popular side yard" if it has not done so already.

Specifically, the collector consults a table 194, which points to linked lists of normal-car-section-sized regions intended to contain popular objects. Preferably, the normal car-section size is considerably larger than the 30 to 60 bytes that has been shown by studies to be an average object size in typical programs. Under such circumstances, it would be a significant waste of space to allocate a whole normal-sized car section to an individual object. For reasons that will become apparent below, collectors that follow the teachings of the present invention tend to place popular objects into their own, single-object car sections. So the normal-car-section-sized regions to which table 194 points are to be treated as specially divided into car sections whose sizes are more appropriate to individual-object storage.

To this end, table 194 includes a list of pointers to linked lists of structures associated with respective regions of that type. Each list is associated with a different object-size range. For example, consider the linked list pointed to by table 194's section pointer 196. Pointer 196 is associated with a linked list of normal-car-sized regions organized into n-card car sections. Structure 198 is associated with one such region and includes fields 200 and 202 that point to the previous and next structures in a linked list of such structures associated with respective regions of n-card car sections. Car-section region 204, with which structure 198 is associated, is divided into n-card car sections such as section 206, which contains object 188.

More specifically, the garbage collector determines the size of the newly popular object by, for instance, consulting the class structure to which one of its header entries points. It then determines the smallest popular-car-section size that can contain the object. Having thus identified the appropriate size, it follows table 194's pointer associated with that size to the list of structures associated with regions so divided. It follows the list to the first structure associated with a region that has constituent car sections left.

Let us suppose that the first such structure is structure 198. In that case, the collector finds the next free car section by following pointer 208 to a car data structure 210. This data structure is similar to FIG. 13's structure 160, but it is located in the garbage-collected heap, at the end of the car section with which it is associated. In a structure-210 field similar to structure 170's field 176, the collector places the next car number of the train to which the object is to be assigned, and it places the train's number in a field corresponding to structure 170's field 172. The collector also stores the object at the start of the popular-object car section in which structure 210 is located. In short, the collector is adding a new car to the object's train, but the associated car section is a smaller-than-usual car section, one that is sized to contain the newly popular object efficiently.

The data-structure organization that FIGS. 13 and 14 depict provides for special-size car sections without detracting from rapid identification of the normal-sized car to which a given object belongs. Conventionally, all car sections' sizes have been the same because a uniform size facilitates rapid car identification. Typically, for example, the most-significant bits of the difference between the generation's base address and an object's address are used as an offset into a car-metadata table, which contains pointers to car structures associated with the (necessarily uniform-size) memory sections associated with those most-significant bits. FIGS. 13 and 14's organization permits this general approach to be used while providing at the same time for special-sized car sections. The car-metadata table can be used as before to contain pointers to structures associated with memory sections whose uniform size is dictated by the number of address bits used as an index into that table.

But the structures pointed to by the metadata-table pointers contain fields exemplified by fields 186 of FIG. 13's structure 170 and FIG. 14's structure 198. These fields indicate whether the structure manages only a single car section, as structure 170 does. If so, the structure thereby found is the car structure for that object. Otherwise, the collector infers from the object's address and the structure's section-size field 212 the location of the car structure, such as structure 210, that manages the object's special-size car section, and it reads the object's car number from that structure. This inference is readily drawn if every such car structure is positioned at the same offset from one of its respective car section's boundaries. In the illustrated example, for instance, every such car section's car structure is placed at the end of the car section, so its train and car-number fields are known to be located at predetermined offsets from the end of the car section.

To appreciate the effect that allocating popular objects to individual cars can is have, consider the process of evacuating FIG. 15's object A from car 1.1 during the collection of that car. (For consistency with FIGS. 12A-J, the object symbols are again placed inside the car symbols, but, of course, the actual object data reside in the car sections that the car structures specify.)

FIG. 15 depicts object A as being referred to by object F, which resides in a car section associated with car 2.1, i.e., in a train newer than the one in which object A resides. The train algorithm therefore requires that object A be evacuated to object F's train. This could be done by moving object A's data into the car section associated with car 2.1. Another alternative, depicted in FIG. 16, is to begin a new car in object F's train and place object A's data in the associated car section. This is the approach conventionally taken when a previous car does not have enough room for the object being copied.

In both cases, a result is that object F's reference to object A needs to be updated; a comparison of FIGS. 15 and 16 reveals that object A is necessarily moved to a different memory-space location. But the actual physical copying—and thus the pointer update—are necessary in the illustrated case only because object A's previous car 11.1 contains other objects, which will not in general end up in the car that object A newly occupies. In other words, if object A had started the collection increment in its own car and were to end it in its own car, the only operation needed to place object A into a new train would be to re-link into the new train the car data structure associated with it; no reference to it would need to be updated. In the illustrated scenario, of course, updating object F's single pointer to object A would typically take less time than re-linking. For popular objects, though, the number of pointers requiring updating can be extremely large, so the benefit of changing train membership solely by re-linking is significant.

The technique employed by the '576 patent therefore places popular objects in their own cars. FIG. 17 illustrates the result of this policy. For the sake of illustration, FIG. 17 shows region 214 as divided into smaller car sections sized to accommodate objects the size of object A. FIG. 18 illustrates moving object A to a new car, but it also indicates that object A remains stored in the same memory-space location. Since object A has not moved, object F's reference to it remains the same, as do all other (not shown) references to object A. So, by placing a popular object in its own car, the collector can avoid the onerous task of updating all the references to it when it is evacuated.

But this advantage can be compromised significantly in multi-threaded, particularly multi-processor, systems. To obtain the full advantage of the multi-processor system's computing power, it is important that programs be so arranged that different parts of their work can be performed in parallel. In particular, it is desirable for remembered-set processing to be performed in parallel. For example, different threads of execution can be assigned different parts of the collection set's remembered set, and the entry processing can proceed in parallel. Unfortunately, the intended performance improvement can be compromised greatly by the need for different threads to coordinate their updating of commonly accessed objects' reference-count fields.

SUMMARY OF THE INVENTION

But I have devised a way of greatly reducing the synchronization cost imposed by popular-object identification and other reference-count operations. My approach is to employ a count map for each thread that is performing remembered-set processing or some other reference-count-maintaining operation. The collector divides into relatively small segments the section, such as a car section, that the thread is searching for referred-to objects. These segments will typically be one, two, four, or some other small number of memory words, and the count map includes an entry for each such segment. As the thread identifies a reference to an object, it increments the value of the entry corresponding to the segment where the object is "located." (For this purpose, an object will usually be considered to be located in the segment containing the object's beginning address, although it is conceivable that some embodiments will take different approaches.) If the count-map entry reaches a threshold value, the thread can arrange to have the corresponding object (or objects if the segments are large enough to contain more than one object) evacuated in the manner appropriate to popular objects rather than to normal objects.

Of course, it will in many cases occur that a single thread's separate count map will fail to identify a popular object as popular; each map's value may represent only a fraction of the total number of references to that object. But the totals can be added together when the different threads finish processing a remembered set. Since the resultant need for coordination among the threads occurs only when a remembered set's processing is completed, not whenever a reference count needs to be incremented, the cost of coordination is relatively low.

BRIEF DESCRIPTION OF THE DRAWINGS

The invention description below refers to the accompanying drawings, of which:

FIGS. 12A-12J, discussed above, are diagrams that illustrate a collection scenario that can result from using the train algorithm;

FIG. 18, discussed above, is a diagram that depicts evacuating that object from the collection-set by re-linking the car that the object occupies;

DETAILED DESCRIPTION OF AN ILLUSTRATIVE EMBODIMENT

Figure 19A:
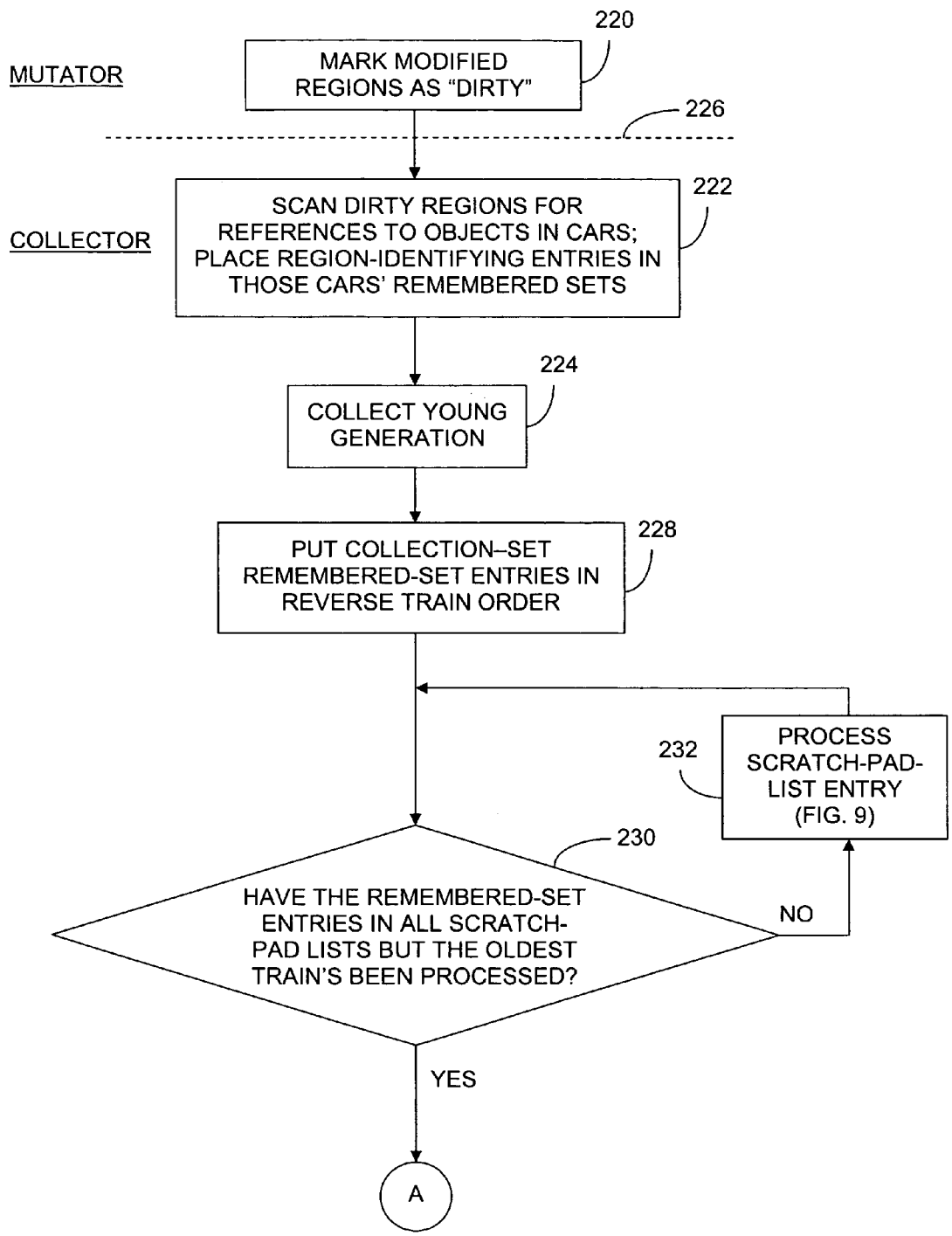
FIGS. 19A and 19B together constitute a flowchart that illustrates a collection interval, as FIGS. 8A and 8B do, but illustrates optimizations that FIGS. 8A and 8B do not include.
Figure 19B:
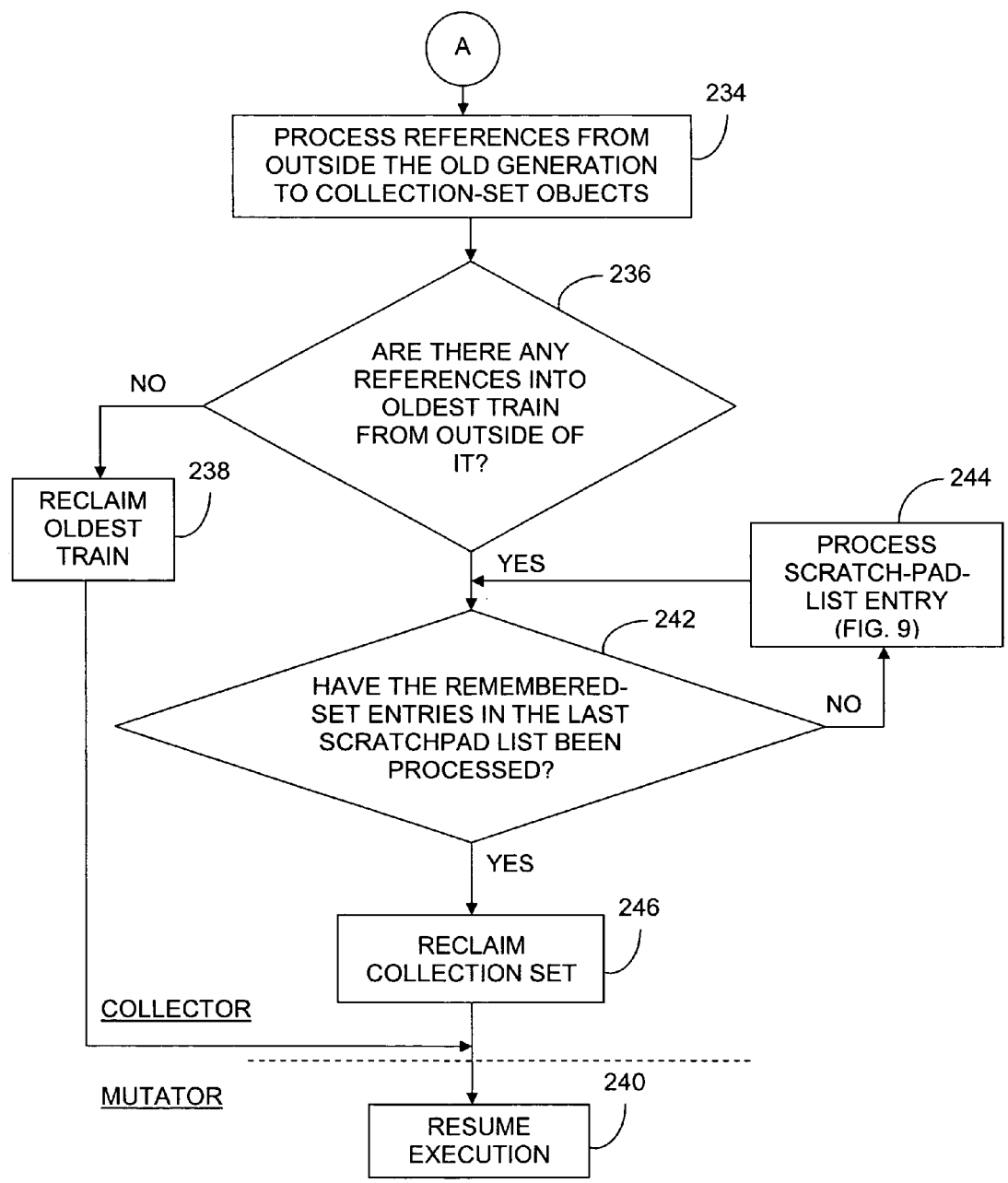

The illustrated embodiment employs a way of implementing the train algorithm that is in general terms similar to the way described above. But it was tacitly assumed above that, as is conventional, only a single car section would be collected in any given collection interval. In contrast, the embodiment now to be discussed may collect more than a single car during a collection interval. FIGS. 19A and 19B (together, "FIG. 19") therefore depict a collection operation that is similar to the one that FIG. 8 depicts, but FIG. 19 reflects the possibility of multiple-car collection sets and depicts certain optimizations that some of the invention's embodiments may employ.

Figure 1:
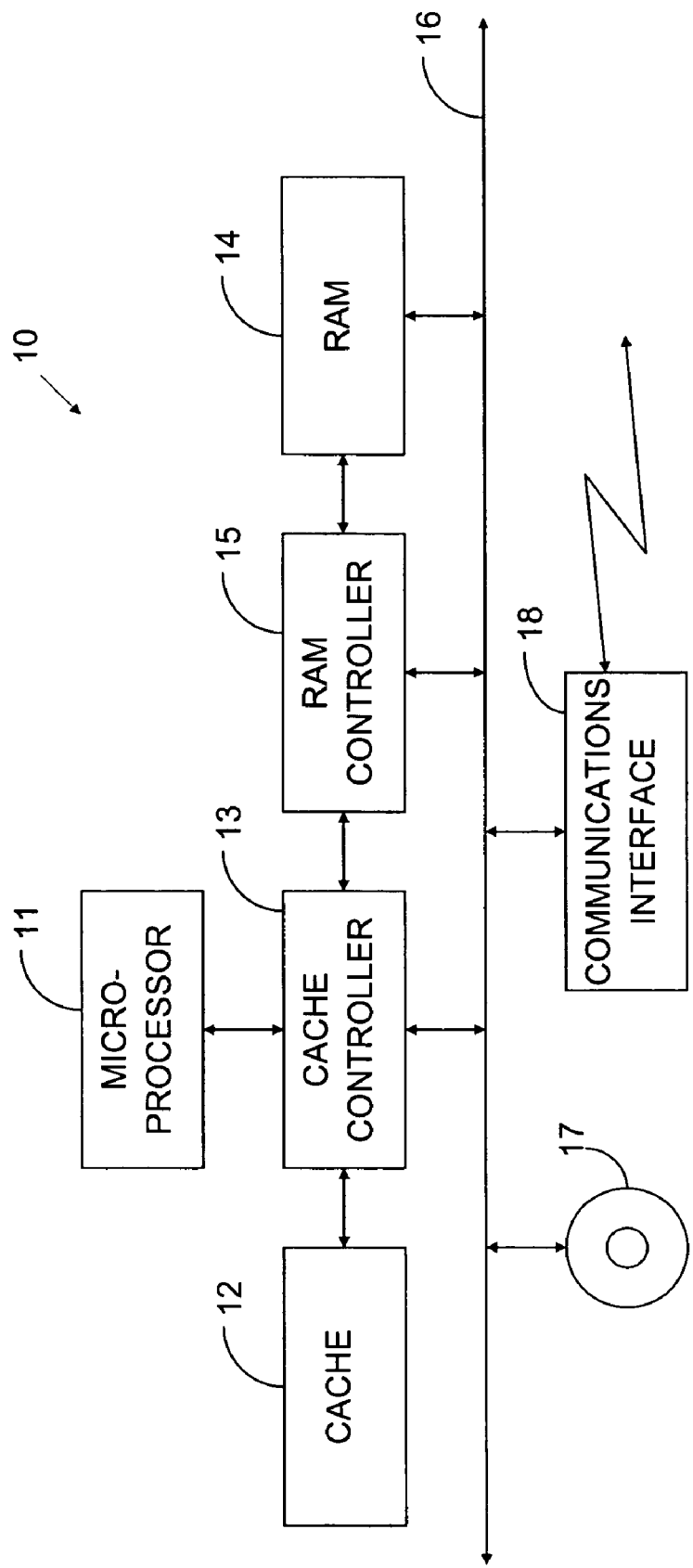
FIG. 1, discussed above, is a block diagram of a computer system in which the present invention's teachings can be practiced.
Figure 2:
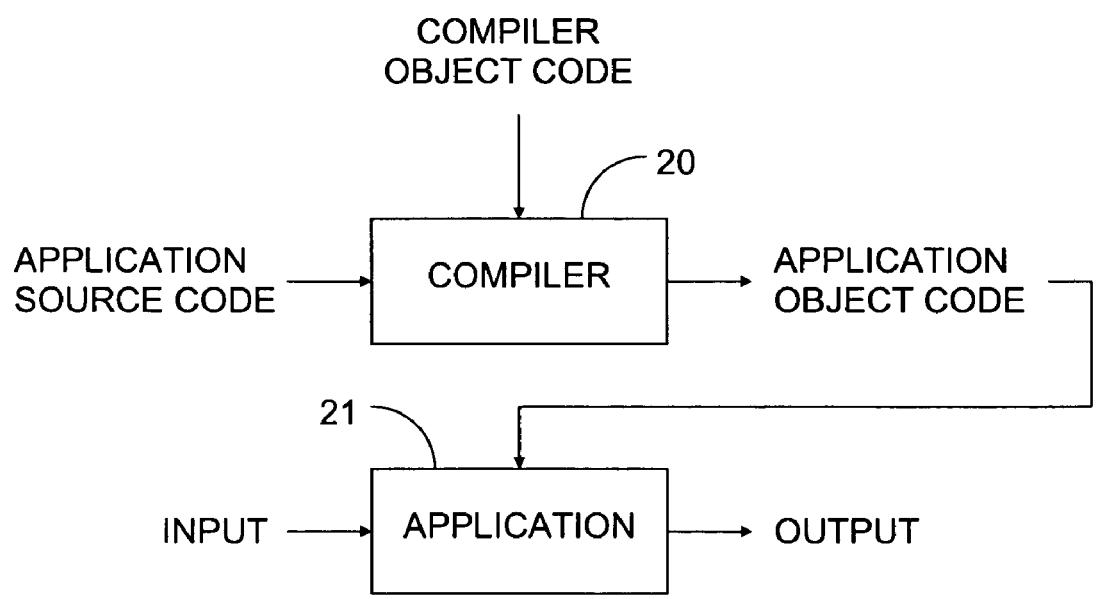
FIG. 2 as, discussed above, is a block diagram that illustrates a compiler's basic functions.
Figure 3:
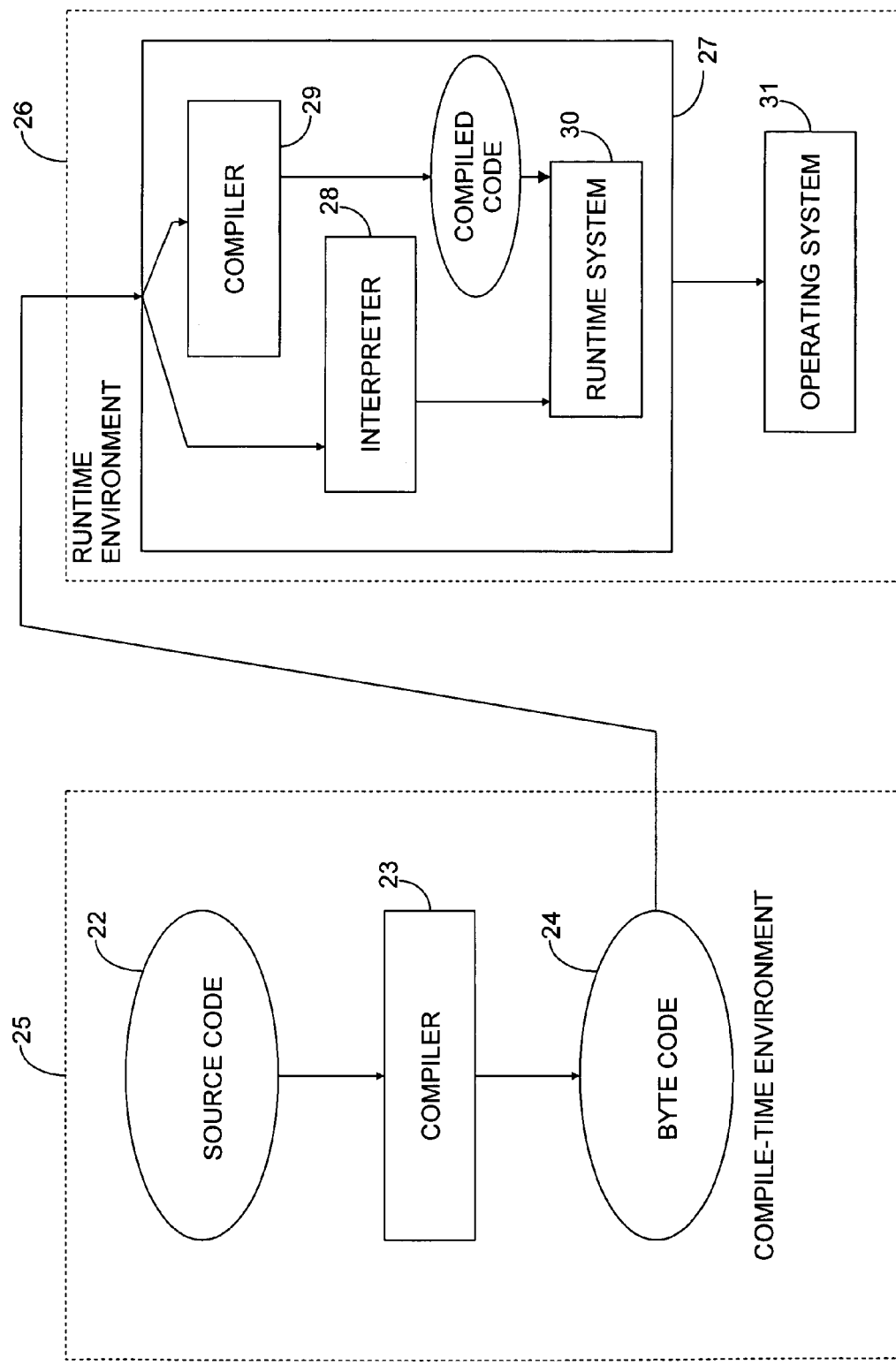
FIG. 3, discussed above, is a block diagram that illustrates a more-complicated compiler/interpreter organization.
Figure 4:
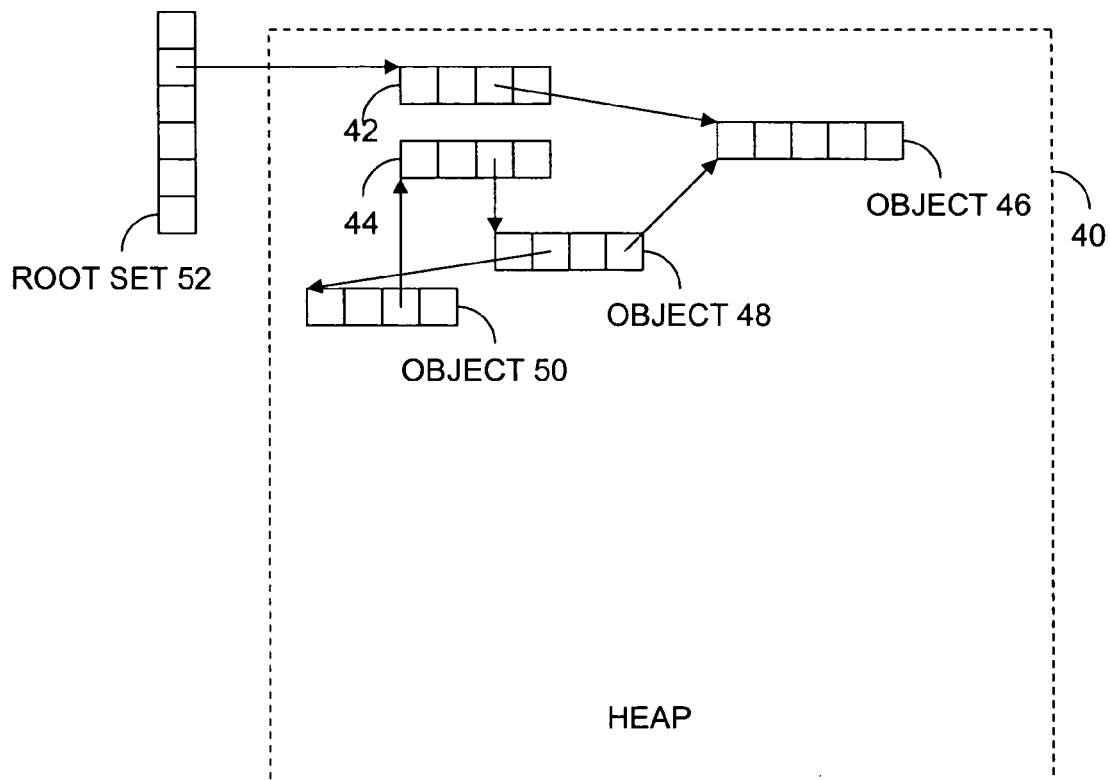
FIG. 4, discussed above, is a diagram that illustrates a basic garbage-collection mechanism.
Figure 5:
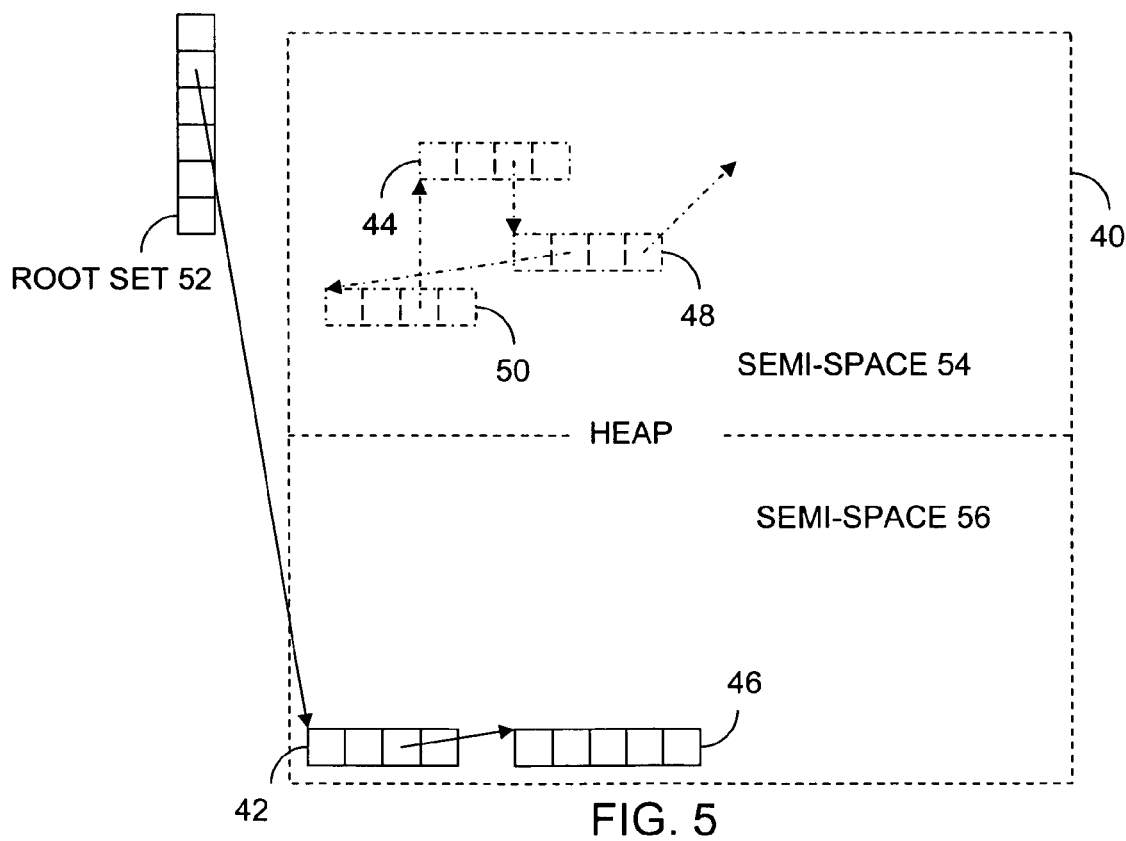
FIG. 5, discussed above, is a similar diagram illustrating that garbage-collection approach's relocation operation.
Figure 6:
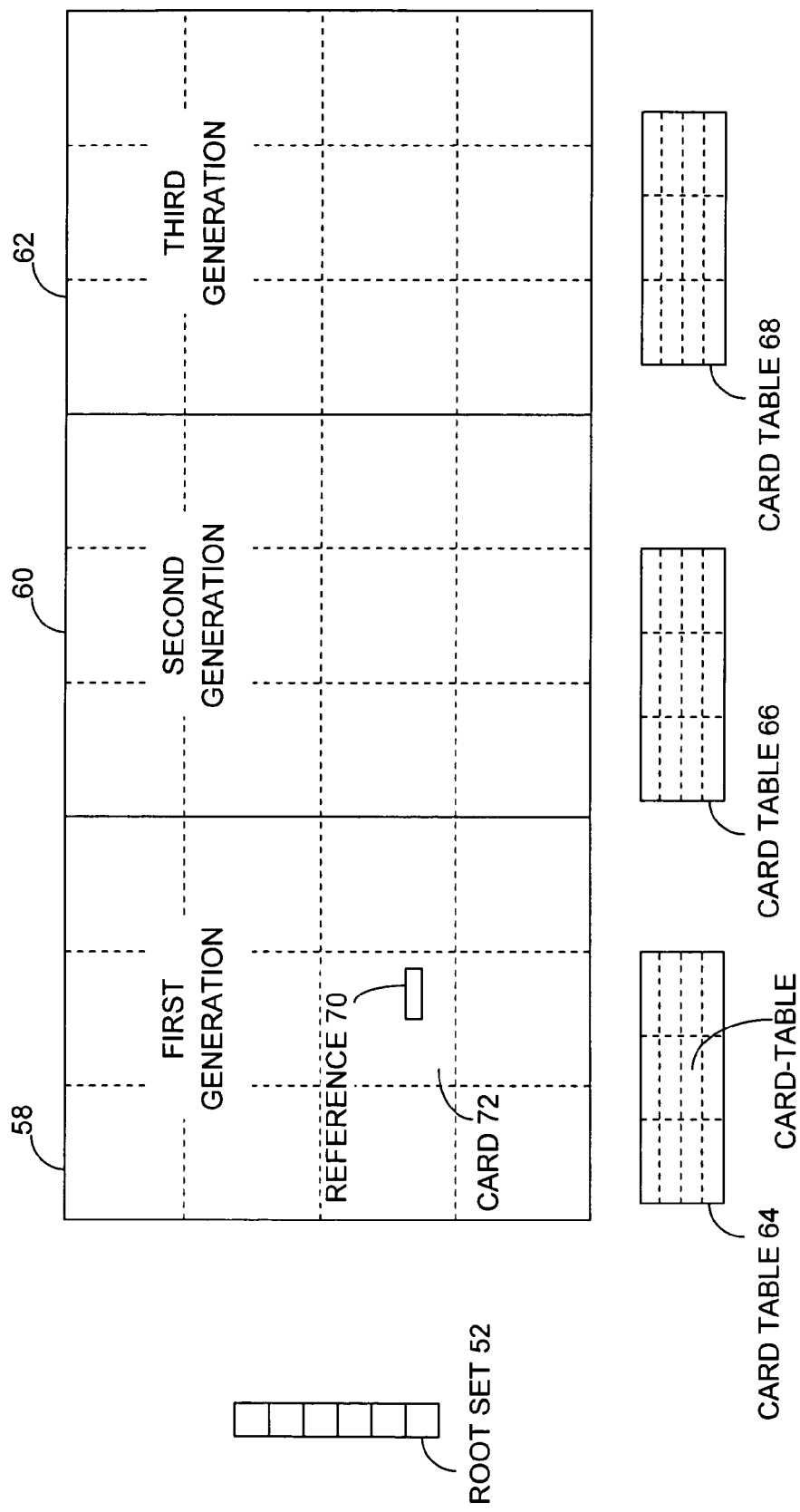
FIG. 6, discussed above, is a diagram that illustrates a garbage-collected heap's organization into generations.
Figure 7:
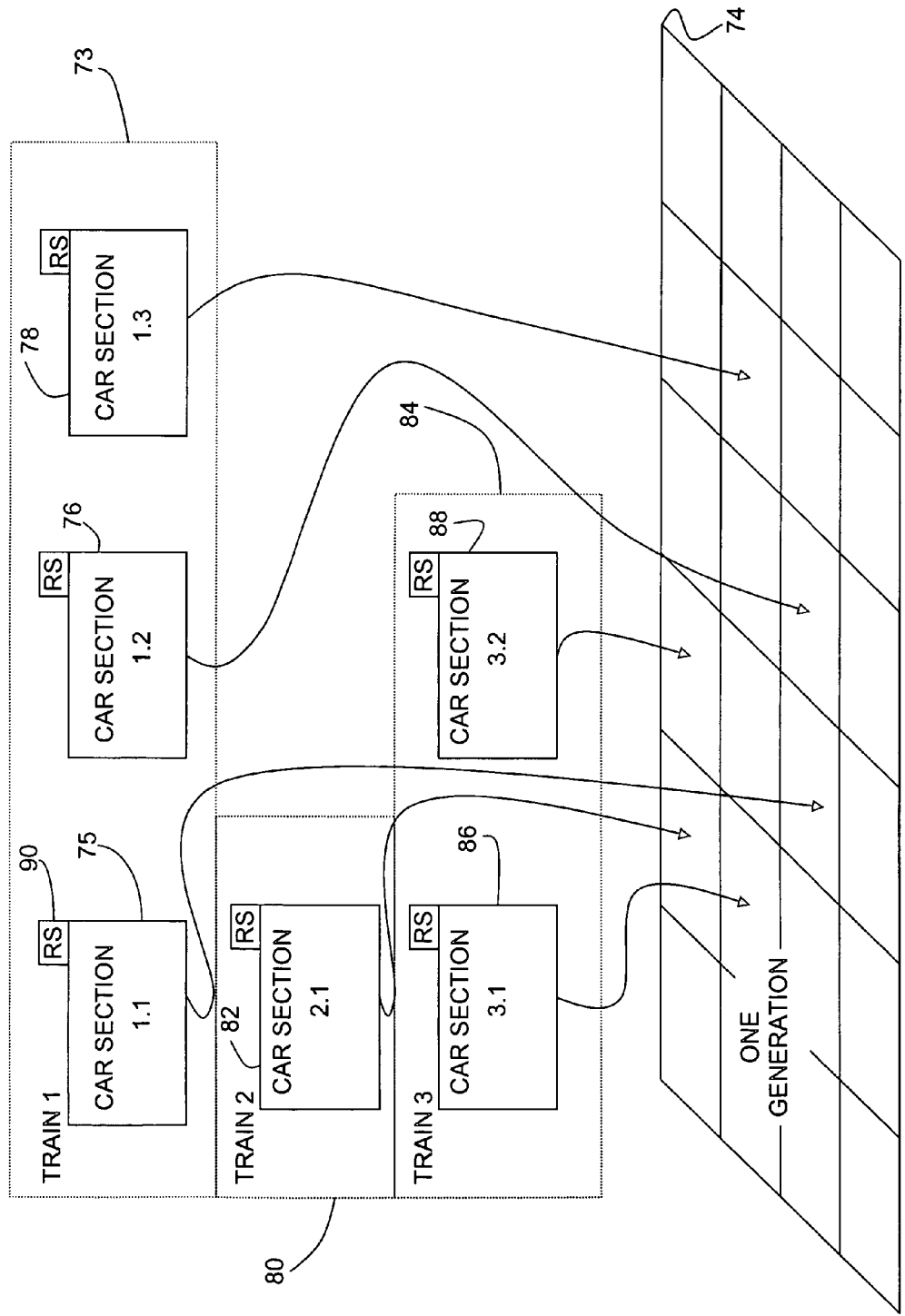
FIG. 7, discussed above, is a diagram that illustrates a generation organization employed for the train algorithm.
Figure 8A:
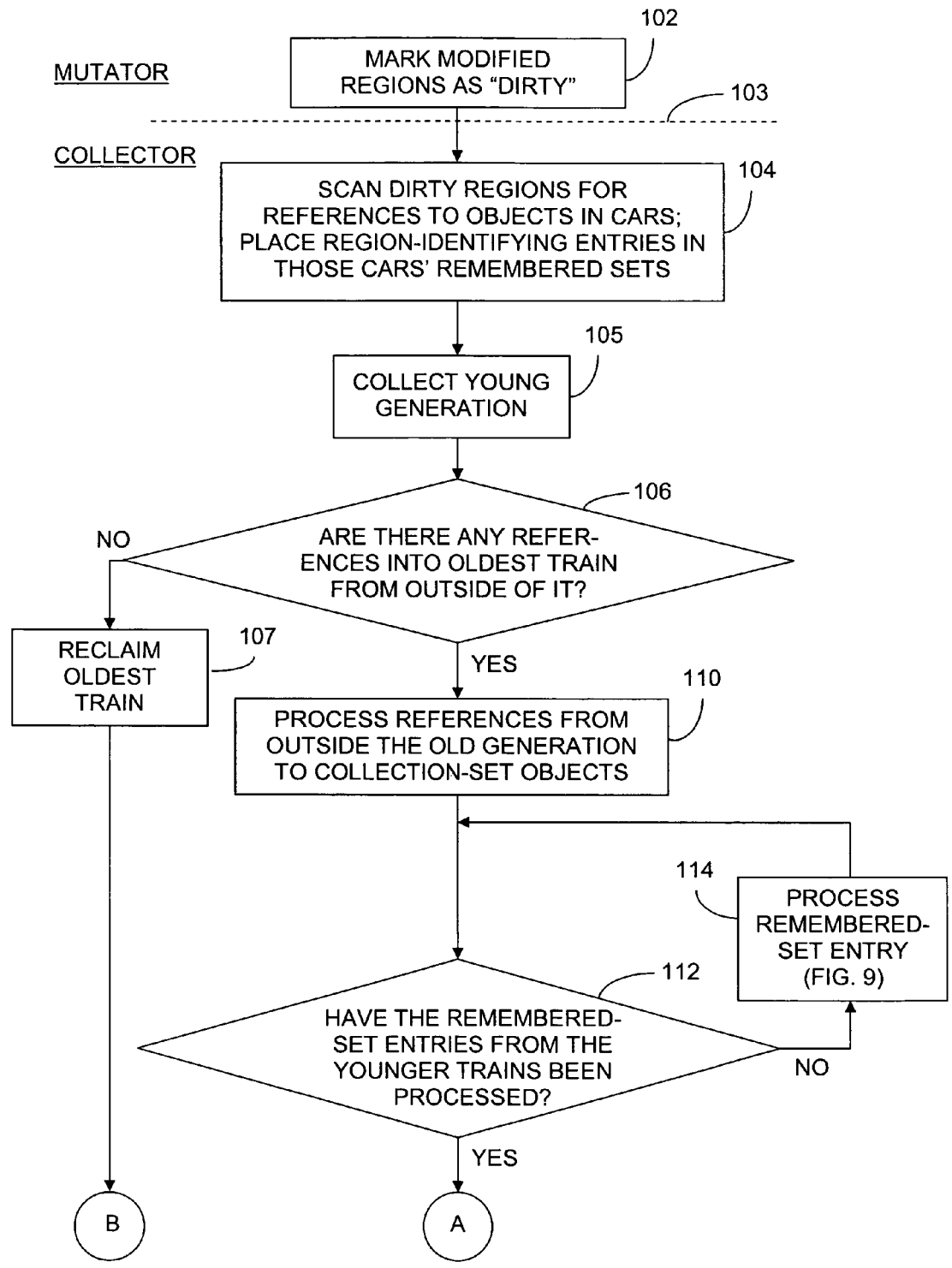
FIGS. 8A and 8B, discussed above, together constitute a flow chart that illustrates a garbage-collection interval that includes old-generation collection.
Figure 8B:
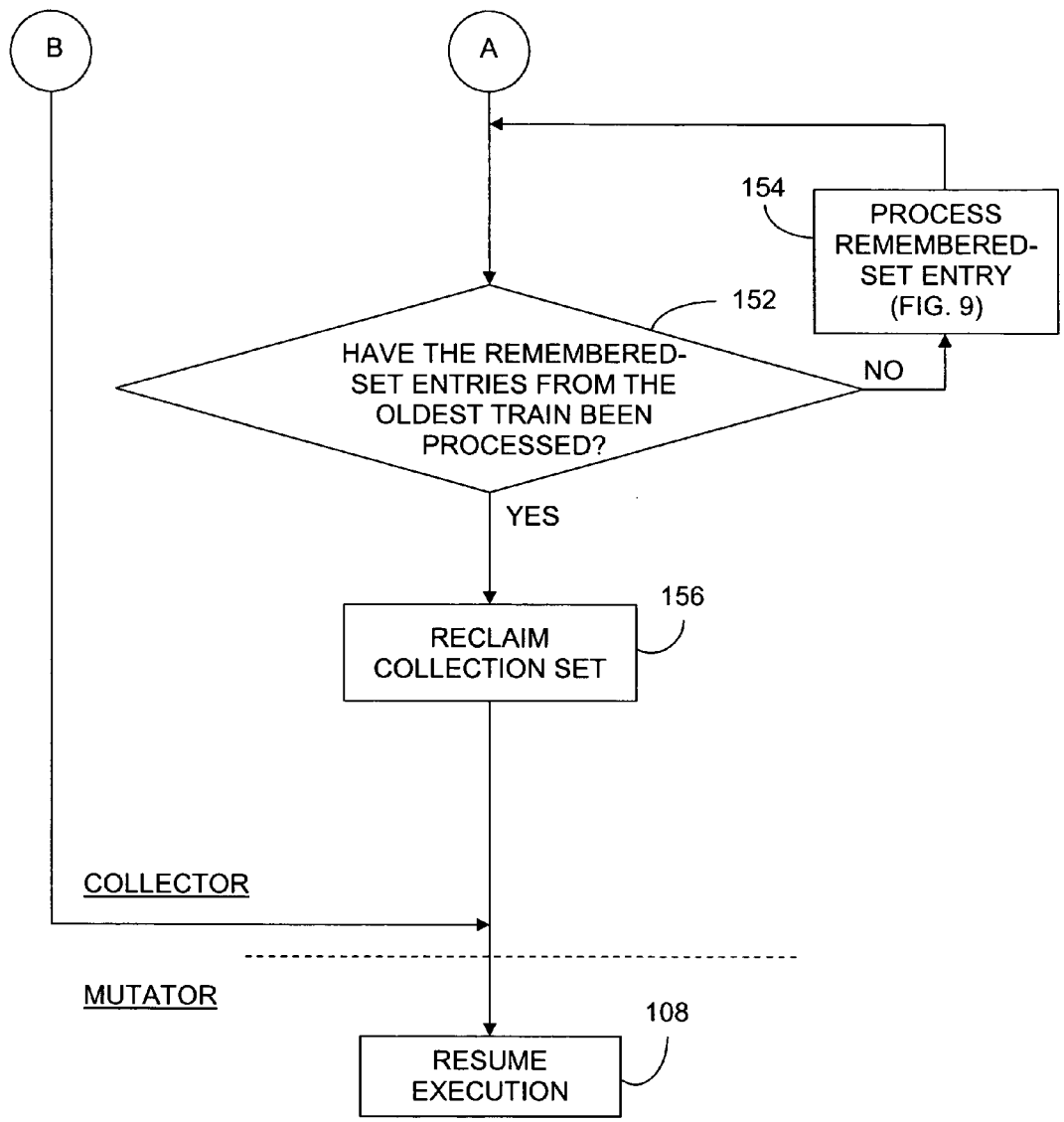
Figure 9:
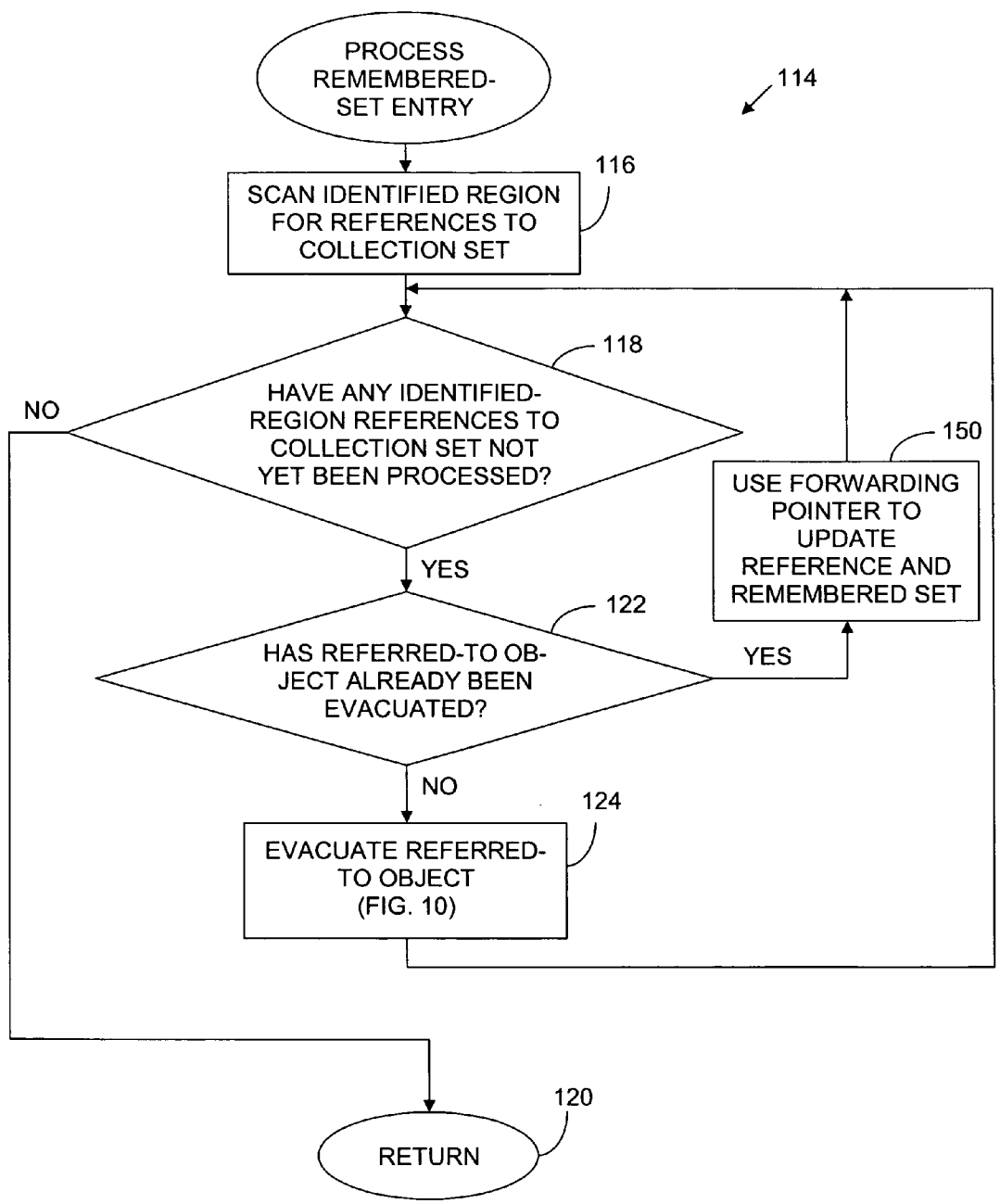
FIG. 9, discussed above, is a flow chart that illustrates in more detail the remembered-set processing included in FIG. 8A.
Figure 10:
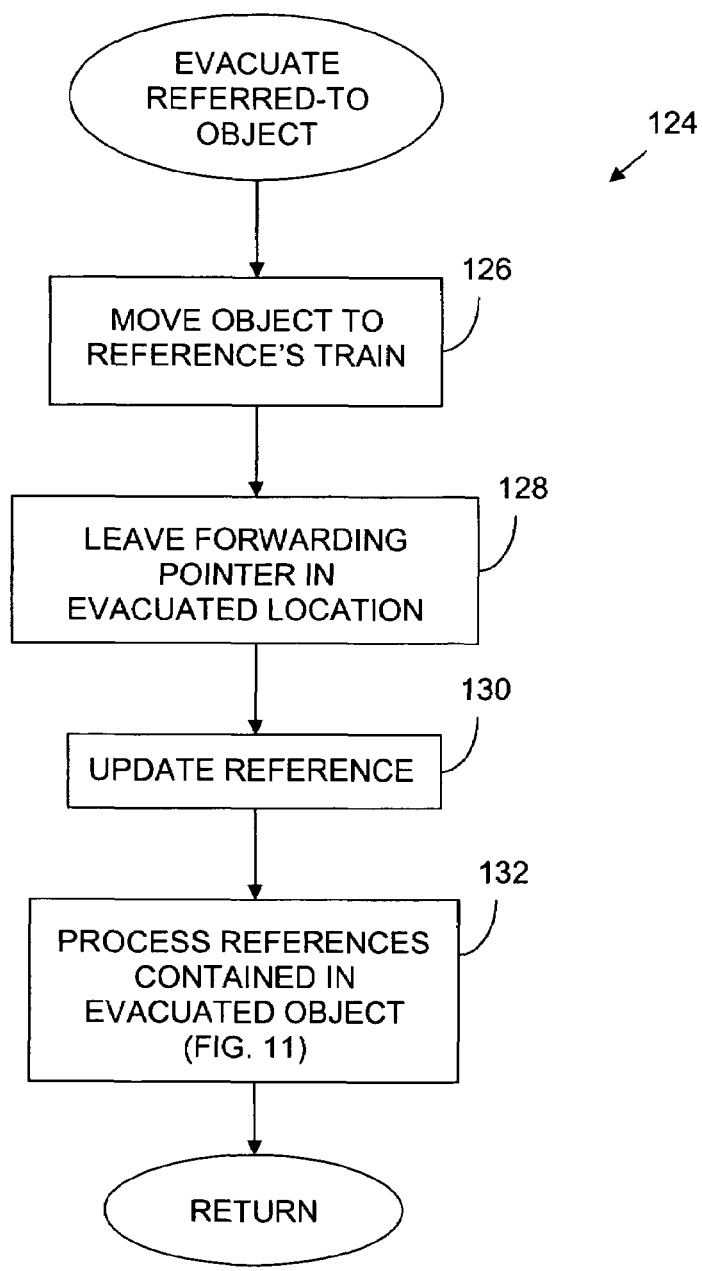
FIG. 10, discussed above, is a block diagram that illustrates in more detail the referred-to-object evacuation that FIG. 9 includes.
Figure 11A:
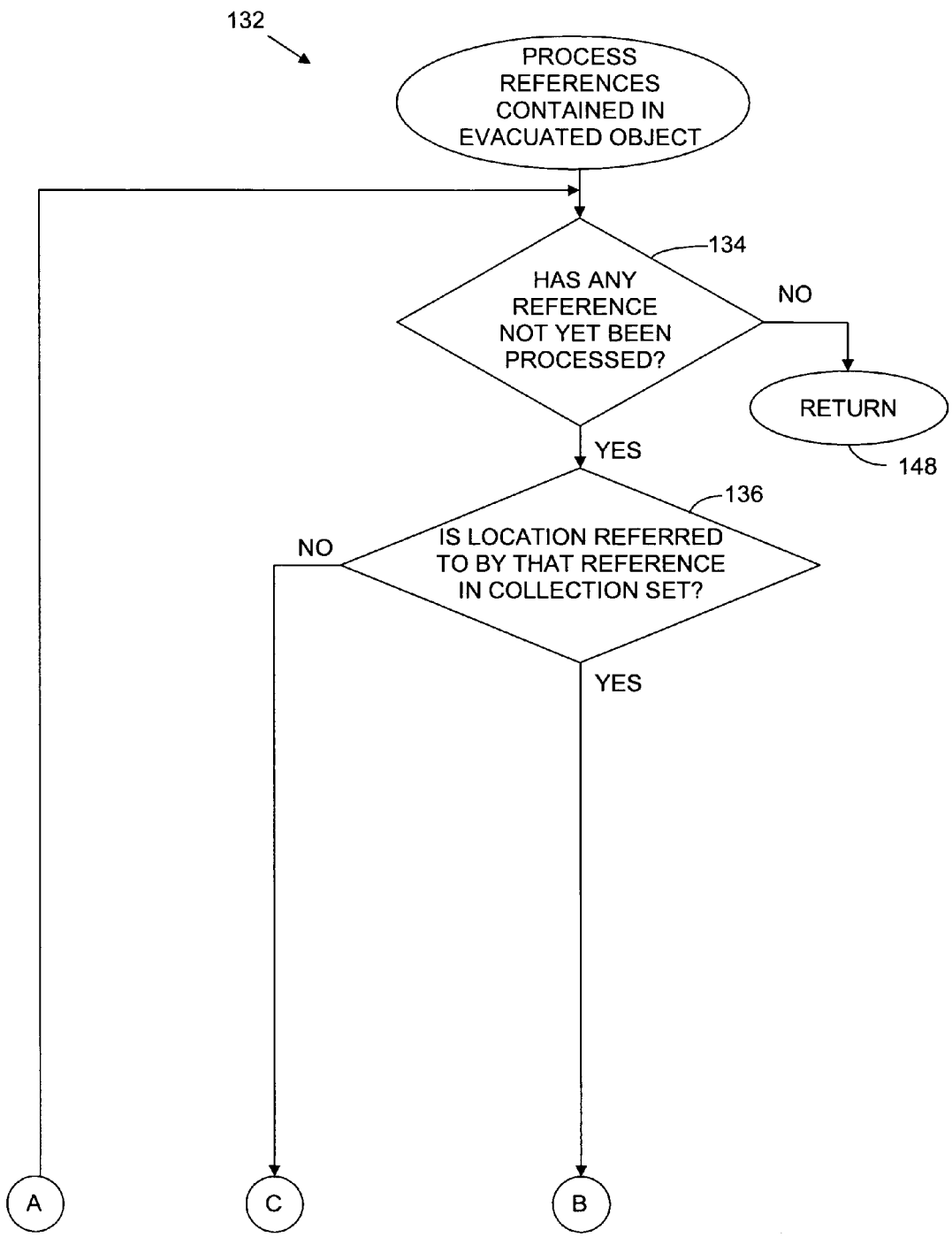
FIGS. 11A and 11B, discussed above, together form a flow chart that illustrates in more detail the FIG. 10 flow chart's step of processing evacuated objects' references.
Figure 11B:
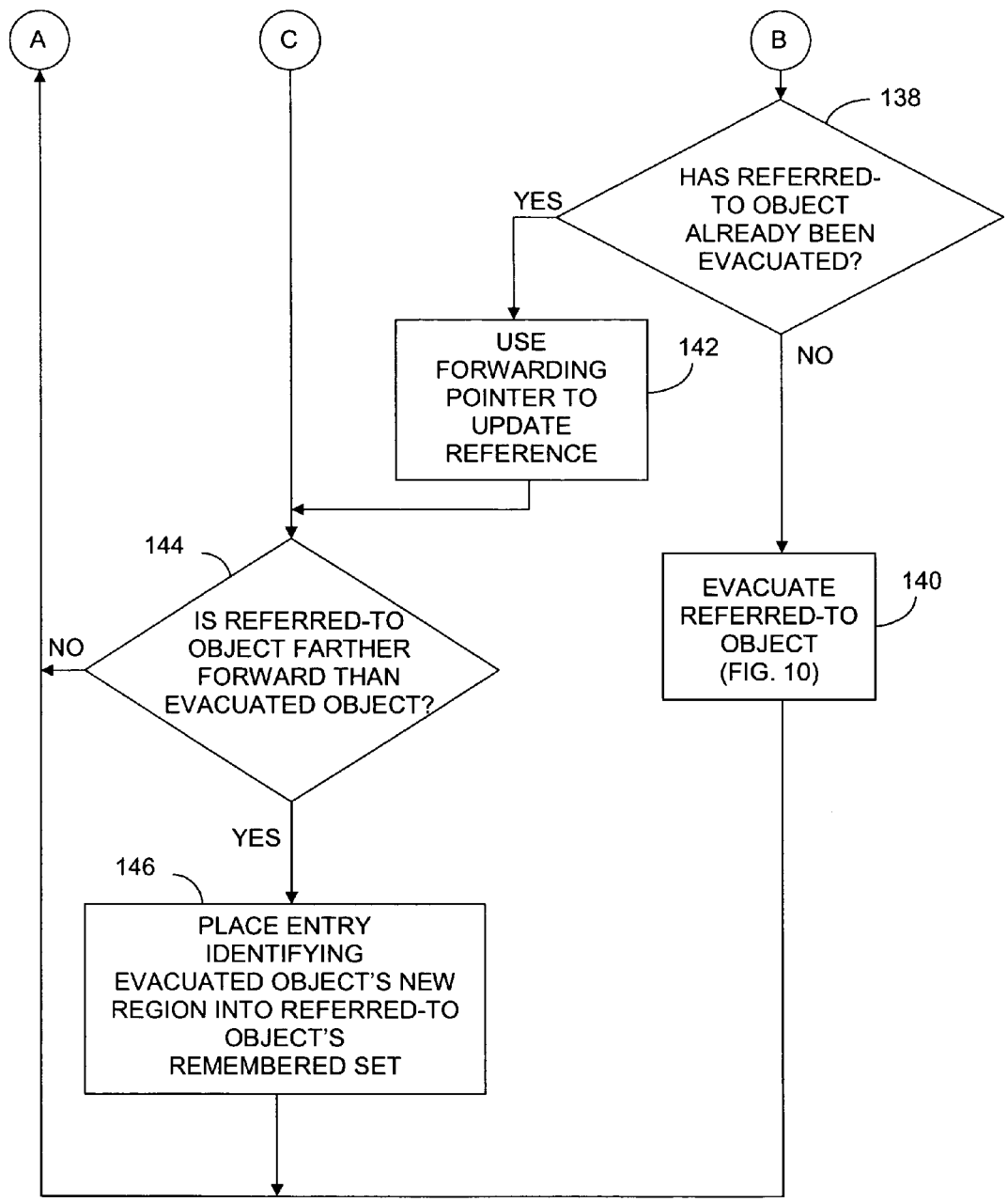
Figure 12A:
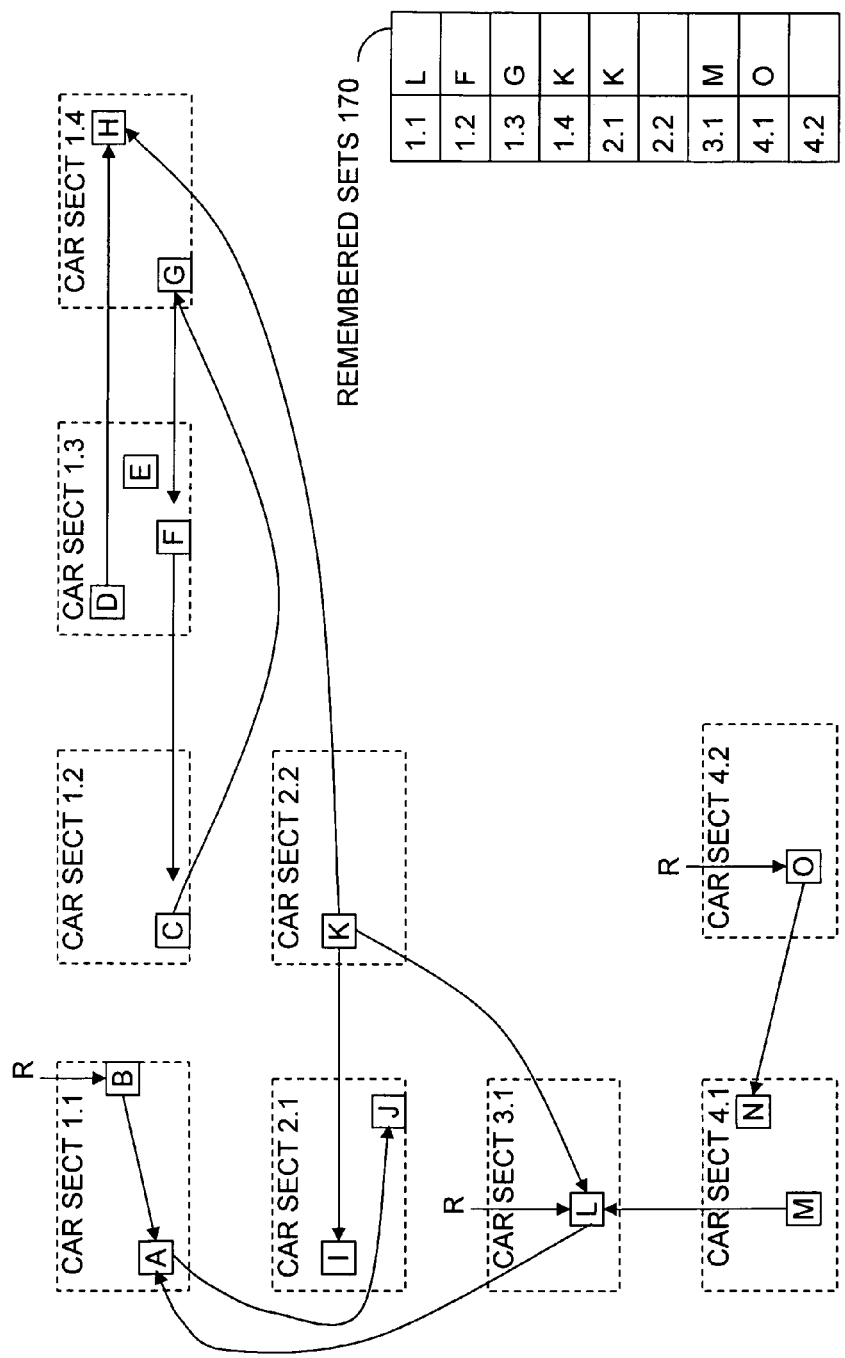
Figure 12B:
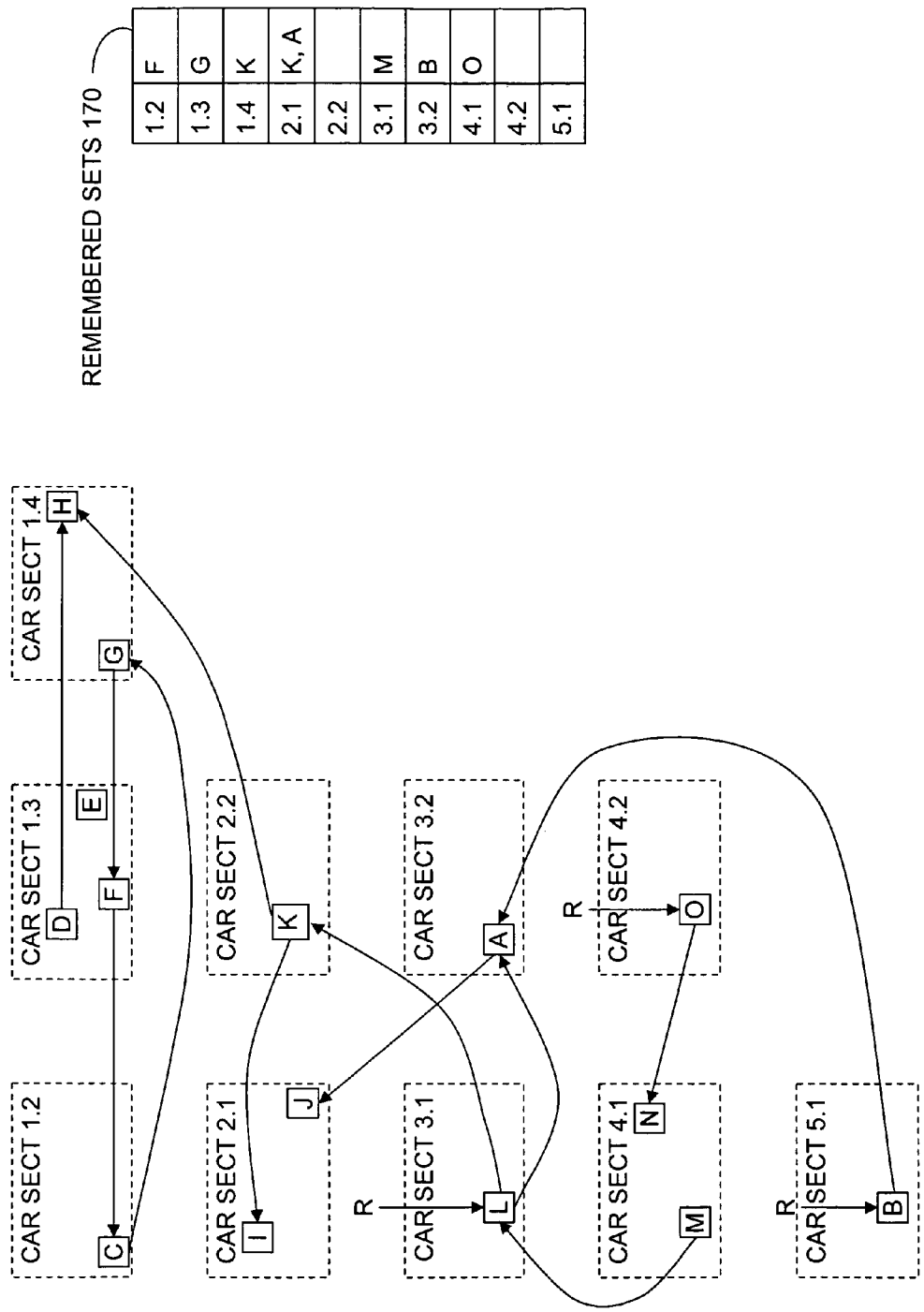
Figure 12C:
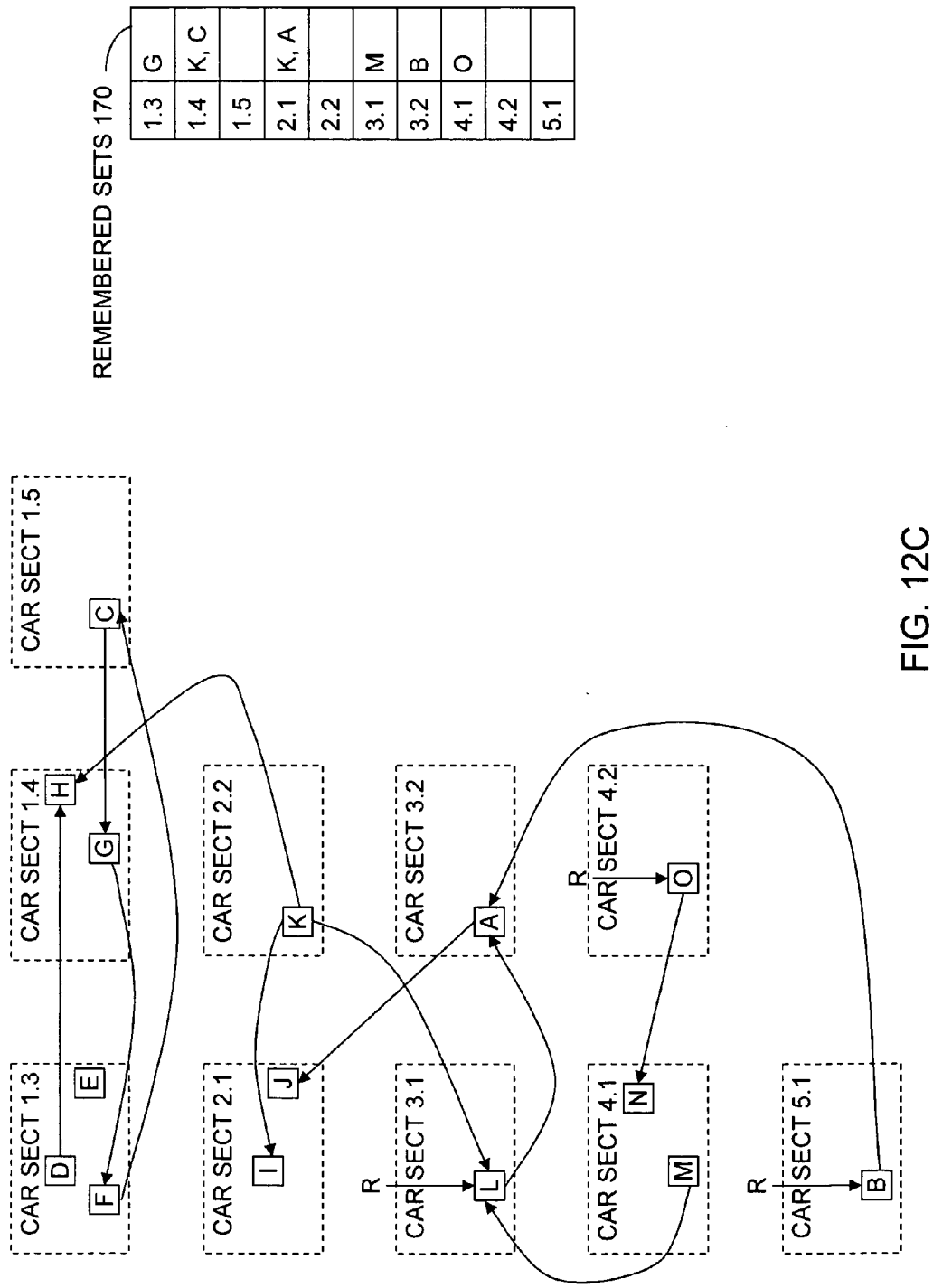
Figure 12D:
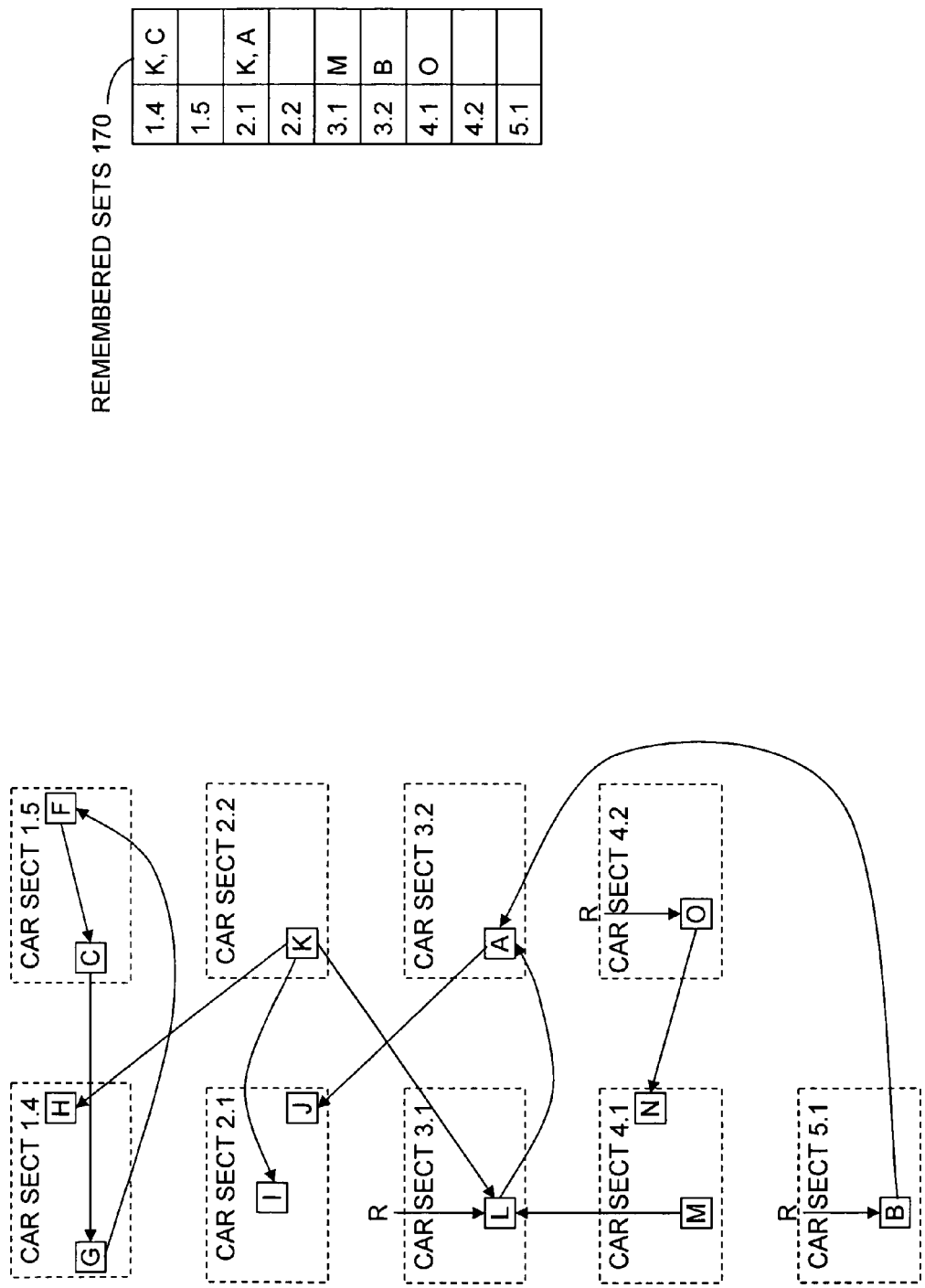
Figure 12E:
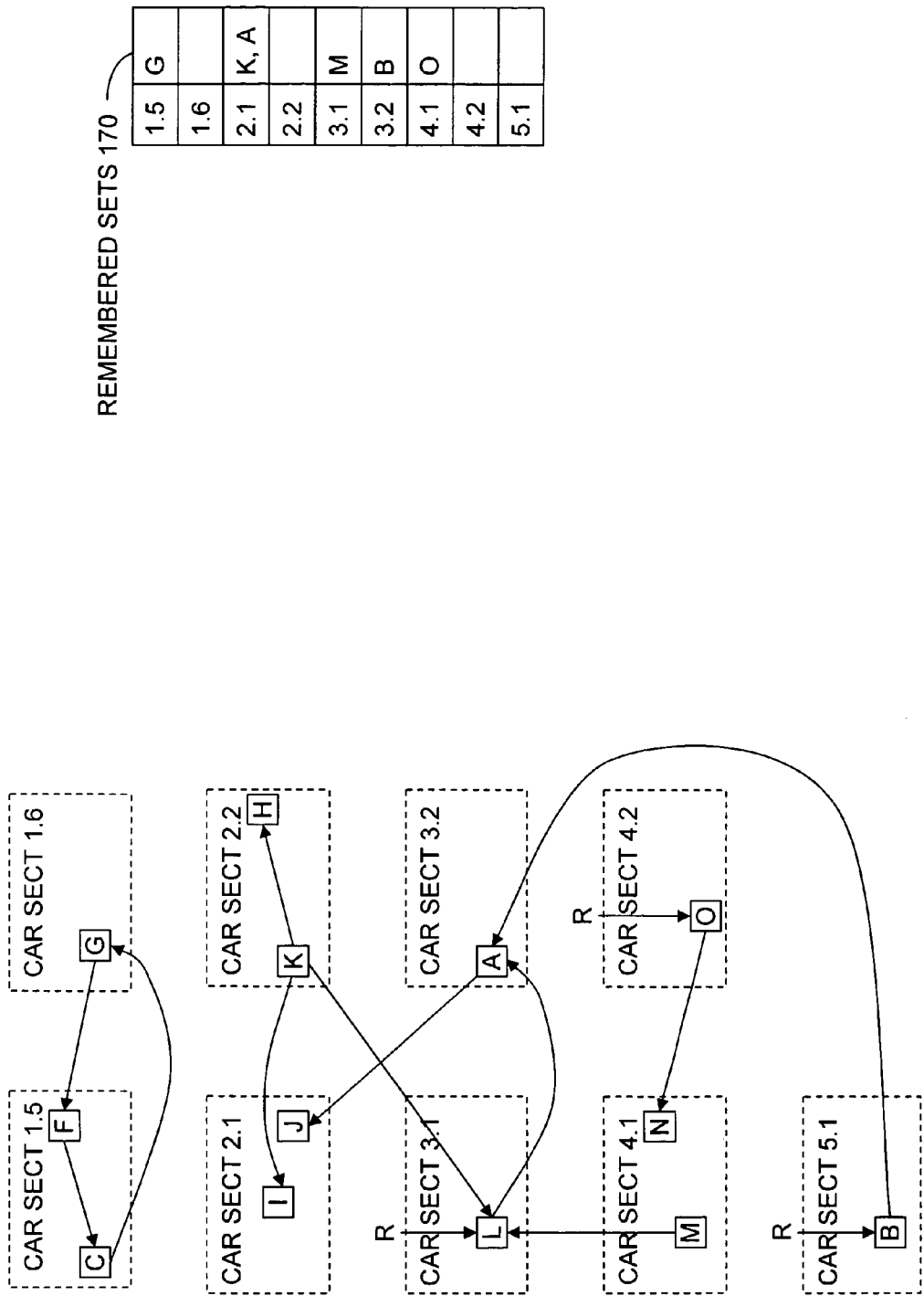
Figure 13:
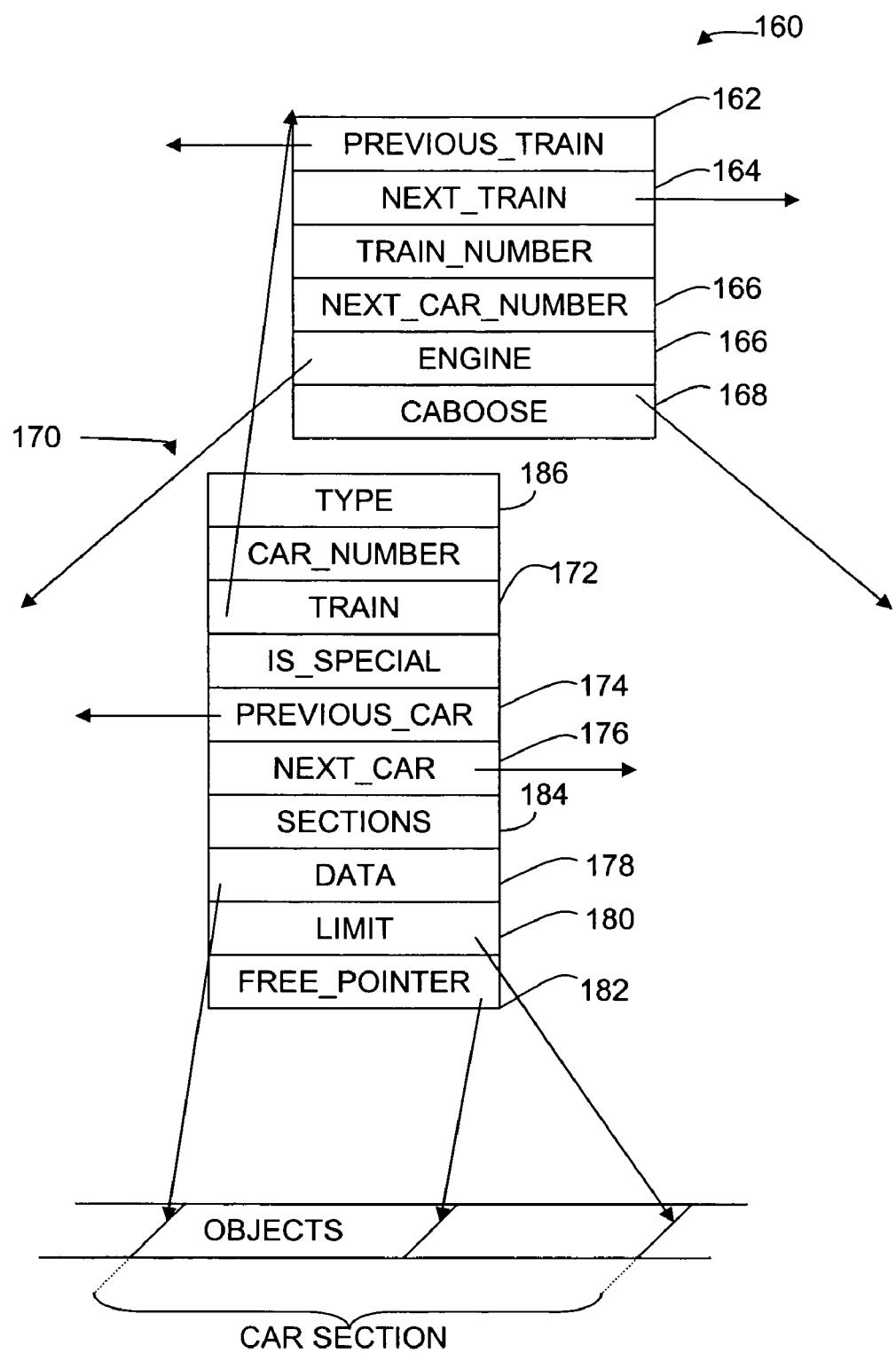
FIG. 13, discussed above, is a data-structure diagram that illustrates structures that can be employed to manage cars and trains in accordance with the train algorithm.
Figure 14:
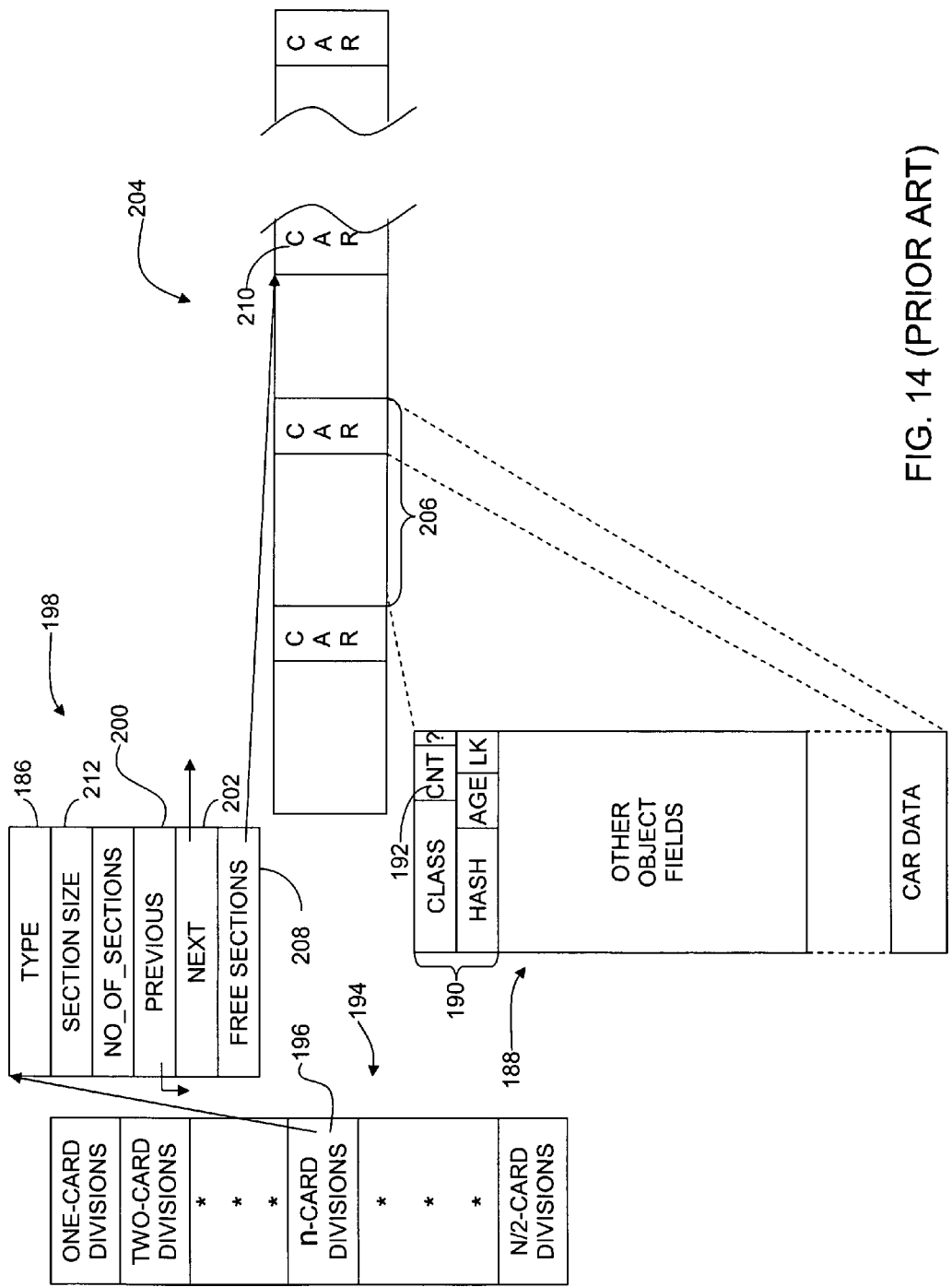
FIG. 14, discussed above, is a data-structure diagram that illustrates structures used in managing different-sized car sections.
Figure 15:
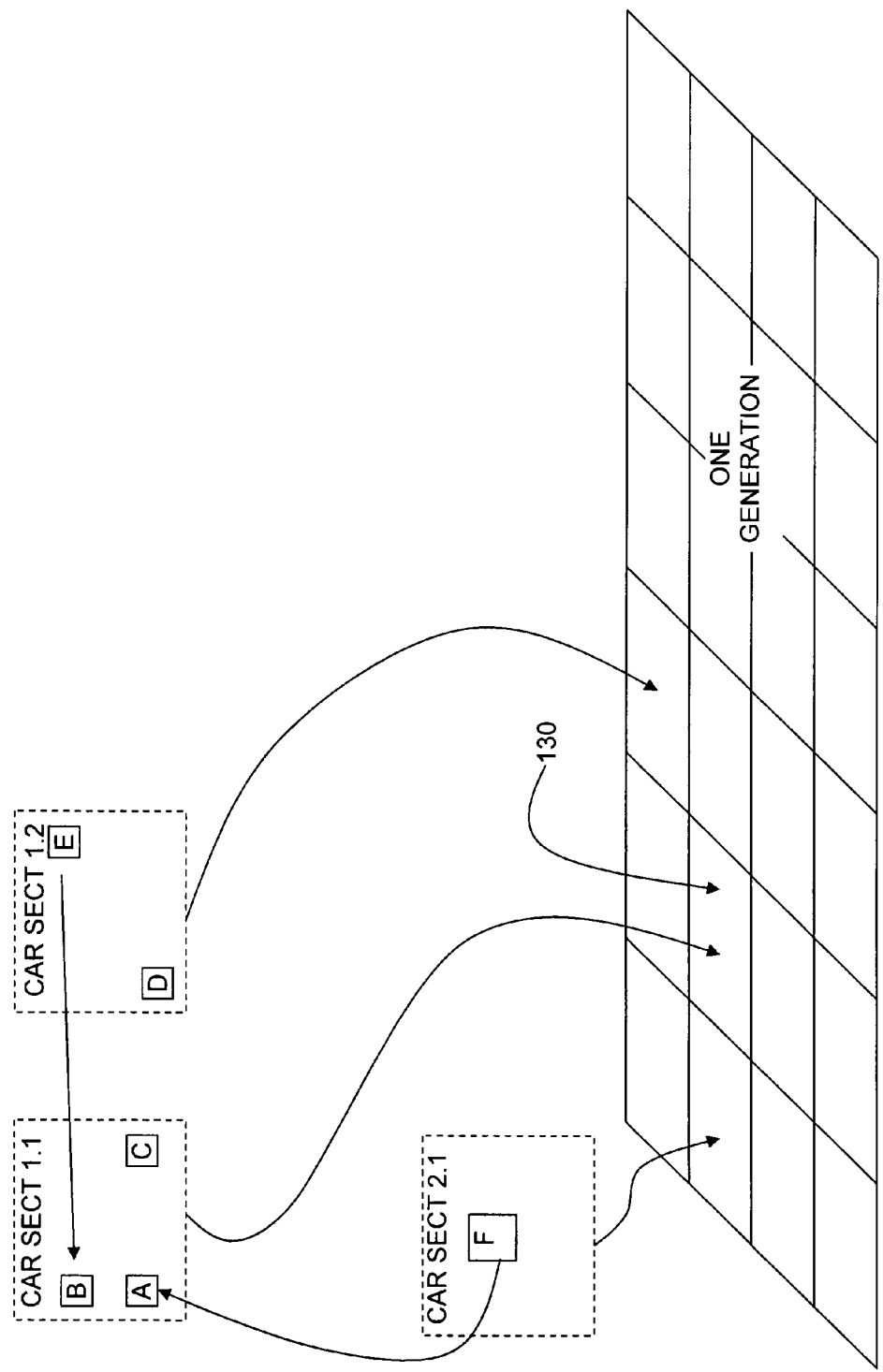
FIG. 15, discussed above, is a diagram that illustrates a collection-set object to which a reference outside the collection set refers.
Figure 16:
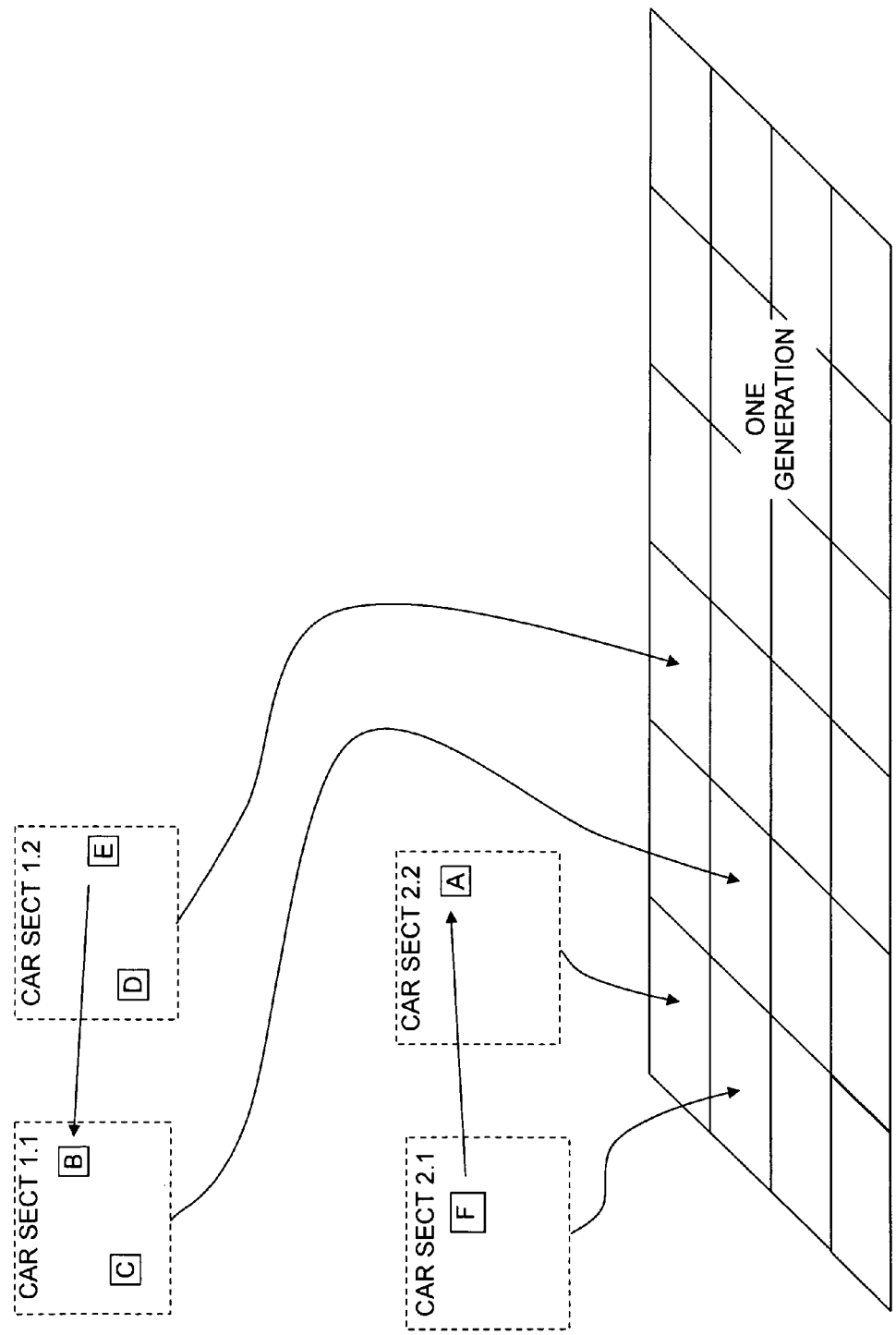
FIG. 16, discussed above, is a diagram that illustrates that object's evacuation by copying.
Figure 17:
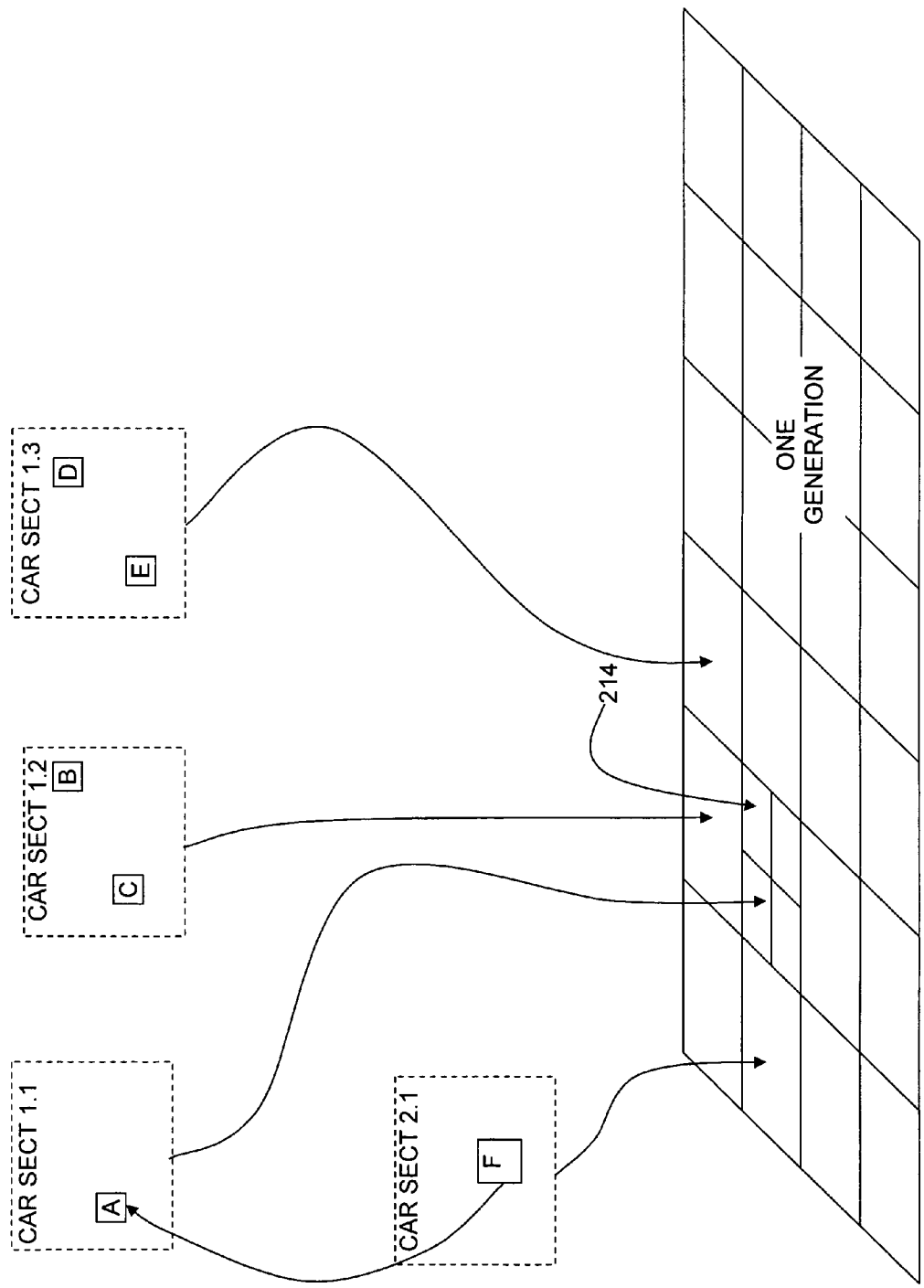
FIG. 17, discussed above, is diagram similar to FIG. 15 but depicting the collection-set object as occupying a single-object train.

Blocks 220, 222, and 224 represent operations that correspond to those that FIG. 8's blocks 102, 106, and 108 do, and dashed line 226 represents the passage of control from the mutator to the collector, as FIG. 8's dashed line 104 does. For the sake of efficiency, though, the collection operation of FIG. 19 includes a step represented by block 228. In this step, the collector reads the remembered set of each car in the collection set to determine the location of each reference into the collection set from a car outside of it, it places the address of each reference thereby found into a scratch-pad list associated with the train that contains that reference, and it places the scratch-pad lists in reverse-train order. As will be seen in more detail below, this is the operation in which various execution threads maintain their respective reference counts. As blocks 230 and 232 indicate, the collector then processes the entries in all scratch-pad lists but the one associated with the oldest train.

Before the collector processes references in that train's scratch-pad list, the collector evacuates any objects referred to from outside the old generation, as block 234 indicates. To identify such objects, the collector scans the root set. In some generational collectors, it may also have to scan other generations for references into the collection set. For the sake of example, though, we have assumed the particularly common scheme in which a generation's collection in a given interval is always preceded by complete collection of every (in this case, only one) younger generation in the same interval. If, in addition, the collector's promotion policy is to promote all surviving younger-generation objects into older generations, it is necessary only to scan older generations, of which there are none in the example; i.e., some embodiments may not require that the young generation be scanned in the block-234 operation.

For those that do, though, the scanning may actually involve inspecting each surviving object in the young generation, or the collector may expedite the process by using card-table entries. Regardless of which approach it uses, the collector immediately evacuates into another train any collection-set object to which it thereby finds an external reference. The typical policy is to place the evacuated object into the youngest such train. As before, the collector does not attempt to evacuate an object that has already been evacuated, and, when it does evacuate an object to a train, it evacuates to the same train each collection-set object to which a reference the thus-evacuated object refers. In any case, the collector updates the reference to the evacuated object.

When the inter-generational references into the generation have thus been processed, the garbage collector determines whether there are any references into the oldest train from outside that train. If there are none, the entire train can be reclaimed, as blocks 236 and 238 indicate.

As block 240 indicates, the collector interval typically ends when a train has thus been collected. If the oldest train cannot be collected in this manner, though, the collector proceeds to evacuate any collection-set objects referred to by references whose locations the oldest train's scratch-pad list includes, as blocks 242 and 244 indicate. It removes them to younger cars in the oldest train, again updating references, avoiding duplicate evacuations, and evacuating any collection-set objects to which the evacuated objects refer. When this process has been completed, the collection set can be reclaimed, as block 246 indicates, since no remaining object is referred to from outside the collection set: any remaining collection-set object is unreachable. The collector then relinquishes control to the mutator.

We now return to FIG. 19's block-228 operation, namely, that of processing the remembered-set entries by searching the locations that those entries identify to determine whether they contain references to objects in the collection set. The references thus identified will be placed in scratch-pad lists associated with the trains in which those preferences are located, and that scratch-pad lists will then be processed in reverse train order: the collection-set objects referred to by the scratch-pad-list entries will be evacuated.

As was mentioned above, aspects of the present invention concern employing parallel execution threads to perform parts of this operation. To perform the operation in parallel threads, the work must be divided among the threads. The particular manner in which this is done is not critical to the present invention, so we will assume a simple work-division approach. Specifically, we will assume that the collector treats each remembered set associated with a collection-set car as divided into partitions. We will also assume, for the sake of example, that the number of partitions is greater than the number of threads and that each thread is initially assigned only a single one of the partitions. Further, we will assume that the threads can contend to claim further partitions when they have completed work on the partitions previously assigned to them. Again, the present invention's teachings can be performed in connection with other work-dividing schemes; this one is assumed simply for the sake of concreteness.

Figure 20:
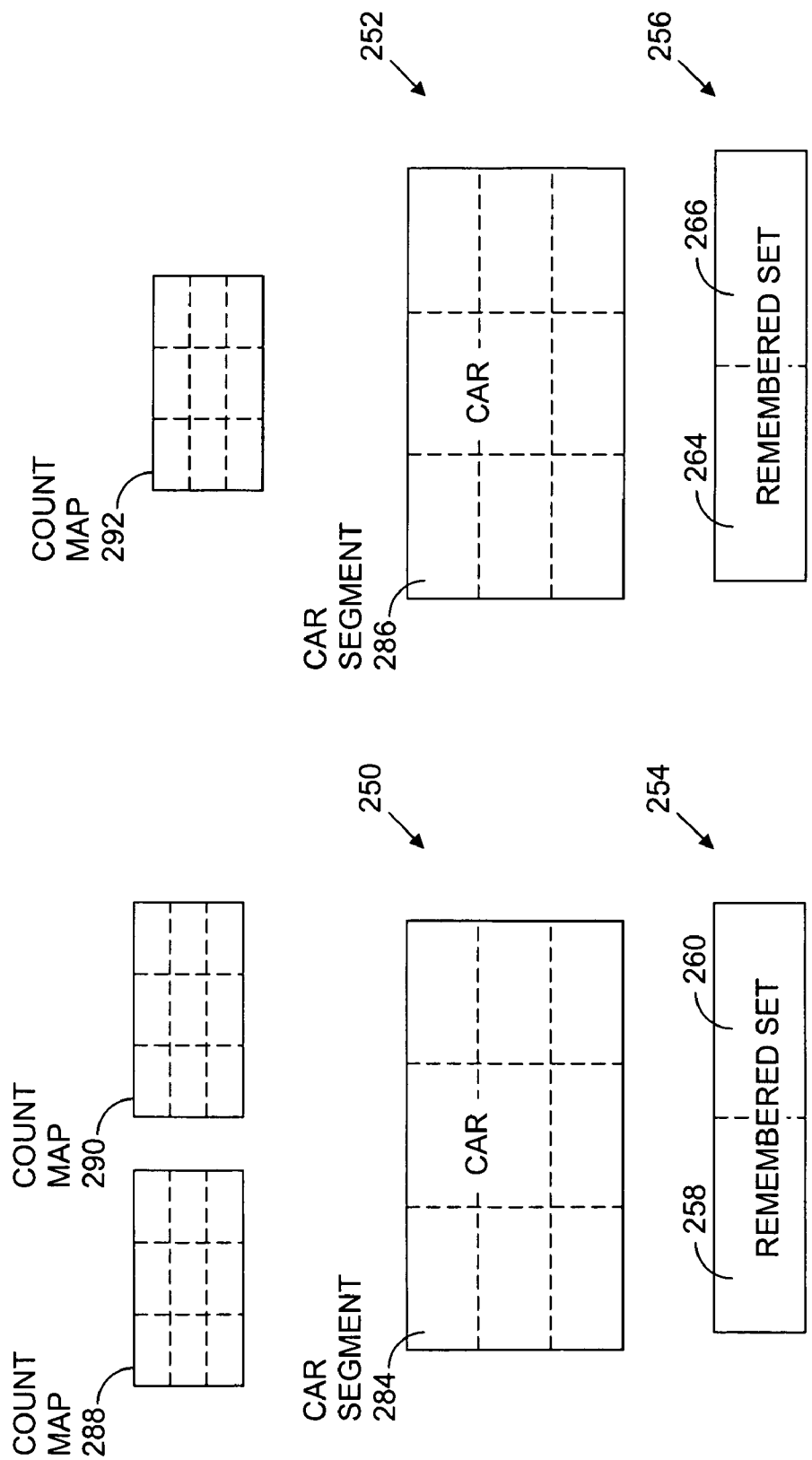
FIG. 20 is a data-structure diagram that depicts car sections as well as the remembered sets and count maps associated with them.

One of the ways of implementing the present invention's teachings can be appreciated by considering a scenario that FIG. 20 will be used to illustrate. FIG. 20 depicts two of the car sections 250 and 252 in a collection set, and it depicts the remembered sets 254 and 256 respectively associated with those car sections. We will assume that three parallel garbage-collector threads are to process the collection set's remembered sets 254 and 256. For this purpose, the collector treats remembered set 254 as being divided into two partitions 258 and 260, and it treats remembered set 256 as similarly being divided into two partitions 264 and 266.

Figure 21:
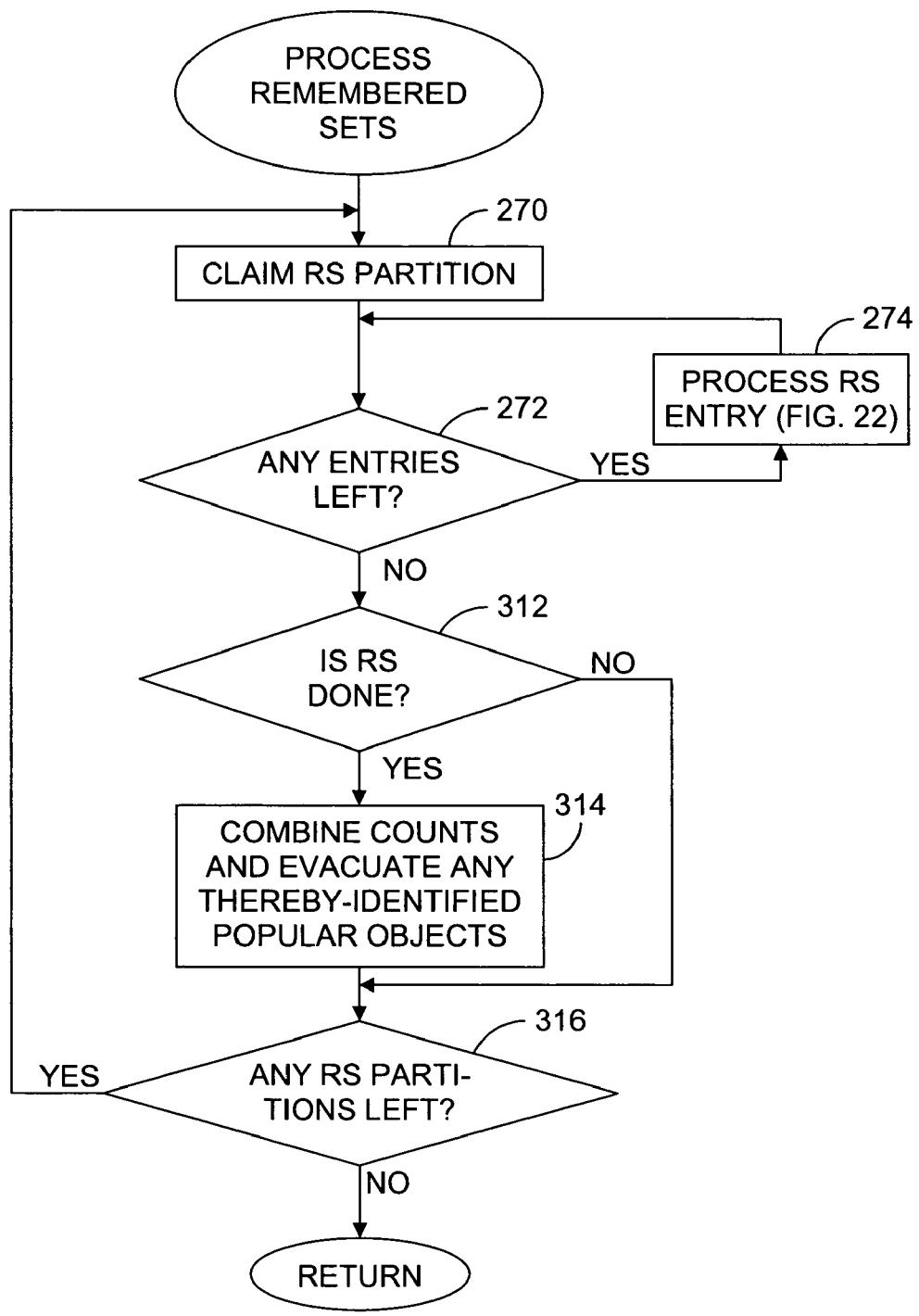
FIG. 21 is a flowchart of a routine that a garbage-collector thread may employ to perform remembered-set processing.

To begin processing remembered-set entries, a thread must therefore claim one of the remembered-set partitions, and FIG. 21's block 270 represents initially taking this step in a routine for processing remembered-set entries. The way in which it goes about claiming a partition is not important to the present invention. But let us assume for the sake of concreteness that there are three threads and that they are respectively assigned FIG. 20's partitions 258, 260, and 264. That is, two of the threads are processing car section 250's remembered-set entries, while another is processing car section 252's entries. As FIG. 21's blocks 272 and 274 indicate, the thread processes a partition's entries until no more entries are left in that partition.

Figure 22:
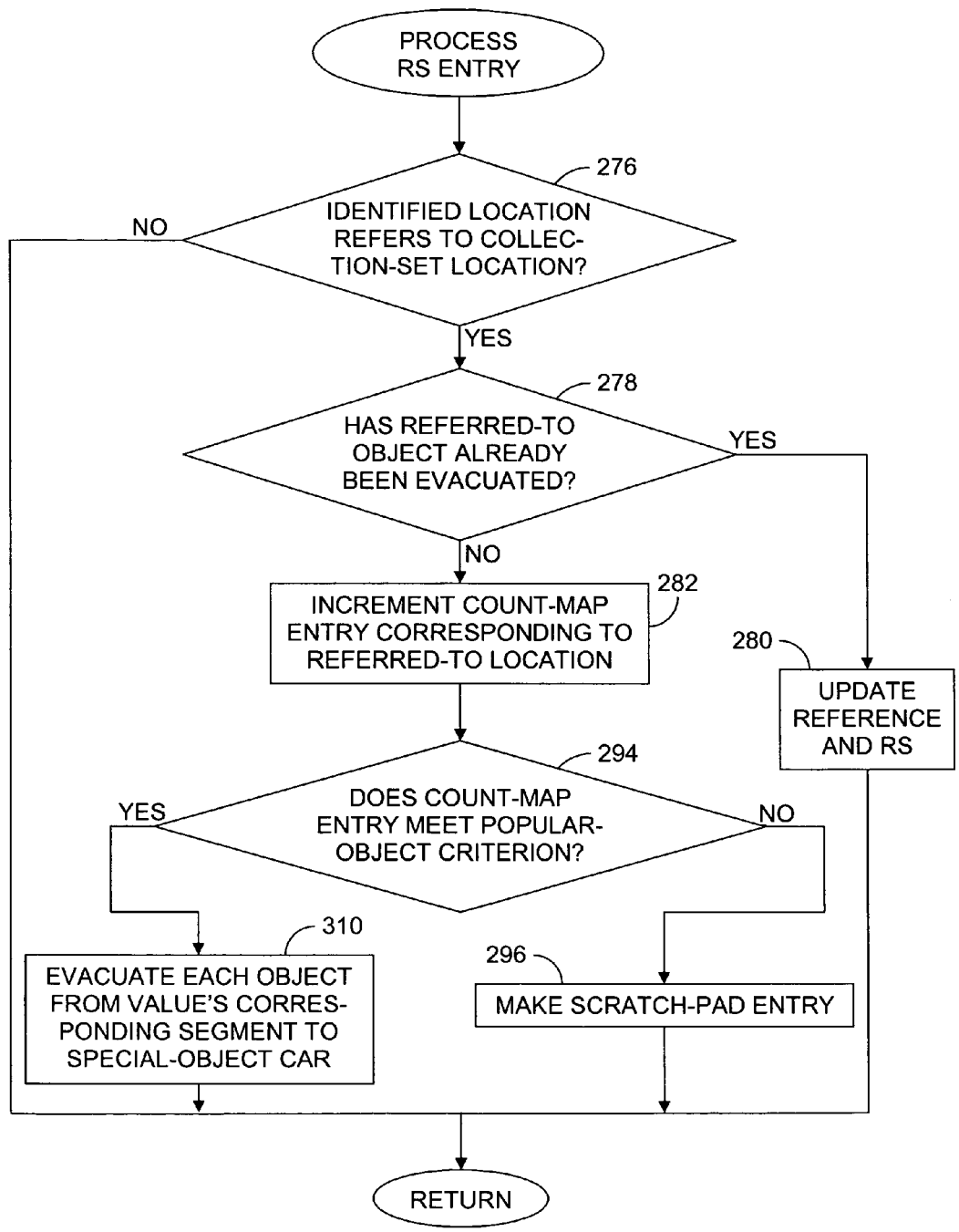
FIG. 22 is a block diagram of a routine that a thread may use to process a single remembered-set entry.

FIG. 22 depicts a routine for processing an entry. Block 276 represents a step used to cull stale remembered-set entries. As was mentioned above, the collector makes entries into the remembered sets as a result of the collector's finding references during card-table processing. But the mutator may thereafter so change a reference that it no longer points to an object in the same car section, yet the card-table-processing operation includes no mechanism for removing remembered-set entries. So the reference identified by a remembered-set entry may be one that referred into the associated car section at one time but has since been modified to refer to some other location. If it is, the test represented by block 276 produces a negative result. As the drawing indicates, the routine simply returns in that case: it makes no corresponding scratch-pad-list entry.

We digress at this point to observe that a collector may interpret some remembered sets' entries as identifying regions large enough to contain more than a single reference. In that case, of course, the block-276 operation as well as other operations in the FIG. 22 routine would need to be performed for each reference in the region that a remembered-set entry identifies. For the sake of simplicity, though, we will assume that each entry identifies a region only large enough to contain a single reference.

Even if the reference still refers to a location in the collection set, there is a possibility, as will be explained presently, that the object previously occupying the referred-to location has already been evacuated from it. So the thread performs an operation, represented by block 278, in which it determines whether the evacuation has already occurred. If so, the reference needs to be updated to point to the evacuated object's location, and the collector does this by copying a forwarding pointer from the location that the evacuated object previously occupied. It will also update the remembered set (if necessary) for the new location's car so that the remembered set reflects the reference's location. Block 280 represents performing these steps, after which the routine for processing that entry returns.

If the referred-to object is still in the collection set and has not been evacuated, the thread increments a count-map entry, in an operation represented by block 282. As FIG. 20 illustrates, the collector treats the collection set's car sections 250 and 252 as divided into a number of segments, such as segments 284 and 286. Each thread that is processing a partition of a given car section's remembered set maintains a map, such as FIG. 20's map 288, that contains an entry corresponding to each of the segments into which the car section is treated as being divided. For the sake of illustration, FIG. 20 depicts car 250 as having two count maps 288 and 290 associated with it; in accordance with the scenario outlined above, there are two threads processing the entries in that car's remembered set. FIG. 20 shows a single count map 292 associated with car section 252, because, in accordance with our assumption, only a single thread is initially processing the entries of that car's remembered set.

For the scenario described above, this number of count maps aptly represents the initial state for an embodiment in which a thread's processing of a remembered-set entry involves searching for references to objects in only the corresponding car section: since each thread has so far been looking for objects in only one car, each needs to maintain only a single count map at the stage of processing that FIG. 20 is intended to depict. But some embodiments will perform remembered-set processing in a different way, as the legend in FIG. 22's block 276 suggests. According to that legend, the test performed by that block's operation is to determine whether the reference in the location identified by the remembered-set entry refers to an object in any collection-set car, not just the one associated with the remembered set being processed. In such an embodiment, a single thread may be maintaining more than one count map even if it has so far processed only a single remembered set's entries, at least if in doing so it has encountered a reference to an object in a collection-set car other than the one associated with the remembered-set entries it is processing.

The size of a car-section segment will typically but not necessarily equal the system's minimum object size, and the size of the corresponding entry in the count map will be large enough to contain the threshold value that the thread uses to identify a popular object. So a typical count-map entry size is a single byte, whereas the size of a typical car-section segment may be say, eight bytes.

When the thread finds a reference that refers to a still-occupied collection-set location, it finds the appropriate count-map entry by computing the offset of that location from the start of the car section, dividing that offset by the ratio of car-section-segment size to count-map-entry size, and adding the result to the location of the corresponding count map. As was mentioned above in connection with FIG. 22's block 282, it then increments that entry's value. Since the count map can be accessed only by the particular thread that is maintaining it, incrementing the count does not require any synchronization.

When the count has been incremented, the thread determines whether the resultant value has reached a popular-object threshold, as block 294 indicates. If it has not, the thread merely makes a scratch-pad-list entry in a scratch-pad list associated with the train to which the reference belongs. Block 296 represents this operation. Now, some embodiments may employ only a single scratch-pad list for each train, in which case the threads will need to synchronize their accesses to it. Preferably, though, the collector employs some technique for minimizing this synchronization cost.

Figure 23:
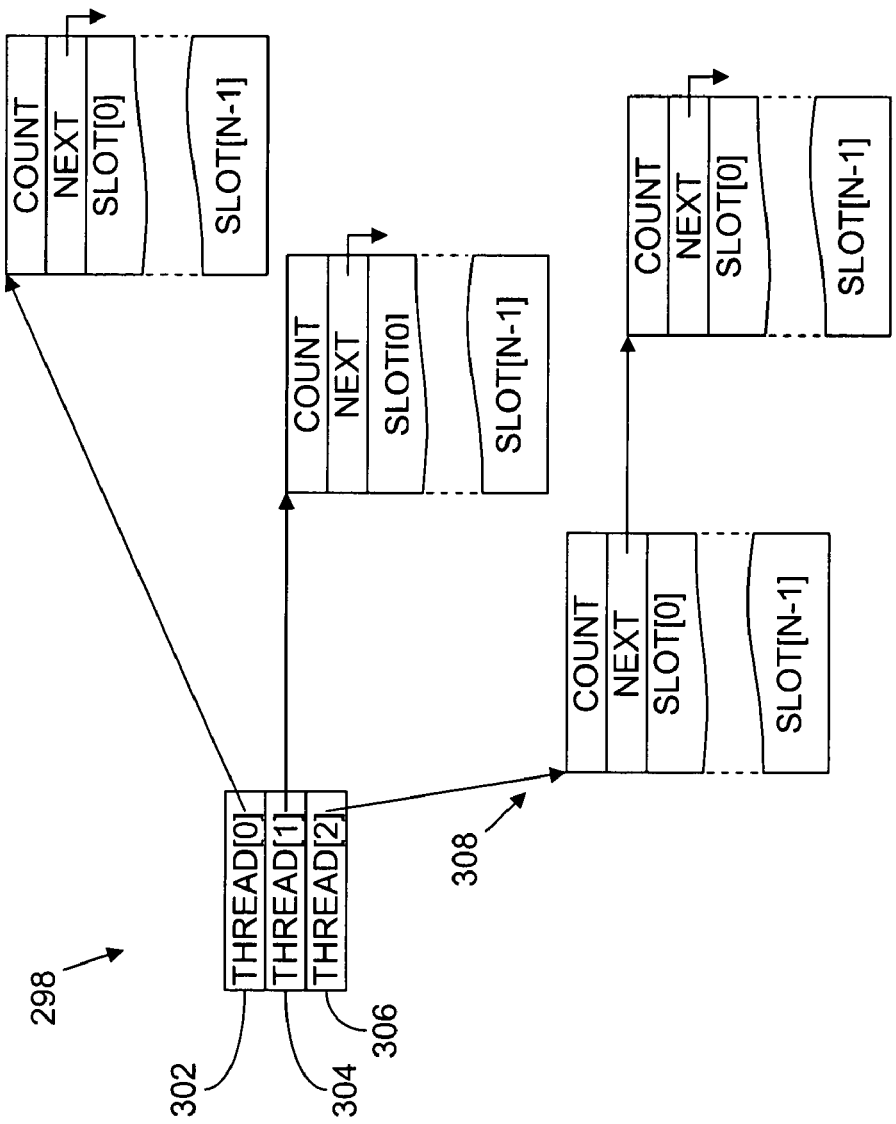
FIG. 23 is a data-structure diagram depicting a structure that can be employed to contain a scratch-pad list that a collector thread uses.

FIG. 23 depicts such a technique. A data structure 298 represents the scratch-pad list for a given train. It includes a set of pointers 302, 304, and 306, which point to linked lists respectively associated with the three threads. The linked lists are lists of array structures, such as structure 308, that contain scratch-pad-list entries made by the associated threads. Since each array list is accessed only by the associated thread, adding an entry does not require any synchronization. This approach affords another benefit: it facilitates parallel performance of subsequent scratch-pad-list processing. That is, each thread can claim a different one of the linked lists for processing, and, having exclusive access to that list, can perform the processing without synchronizing access to its entries.

Figure 24:
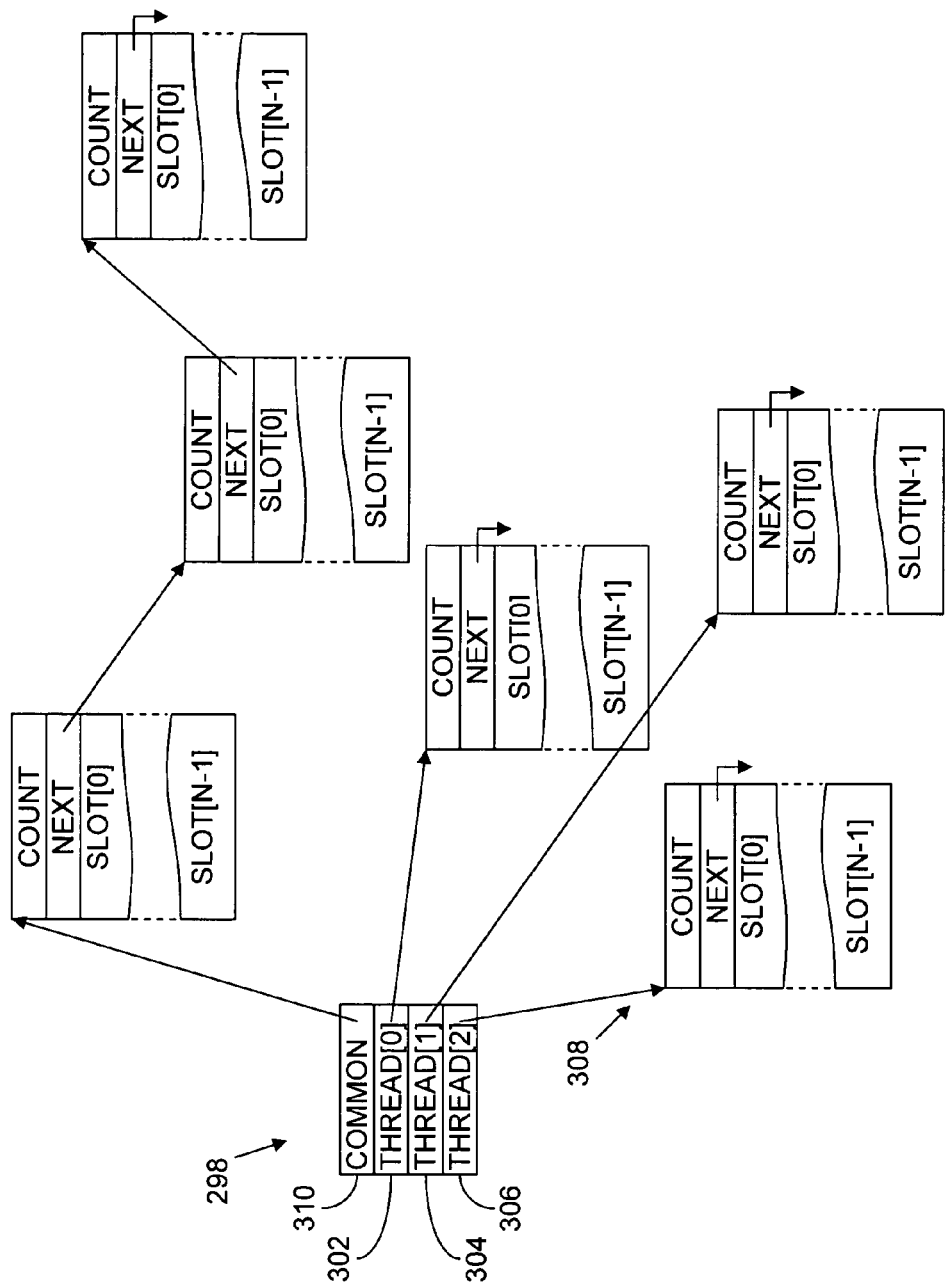
FIG. 24 is a data-structure diagram depicting another structure that can be employed to contain a scratch-pad list that a collector thread uses.

FIG. 24 suggests an alternative approach, which is to have the threads from time to time move their lists' contents into a common linked list, one identified by pointer 310. More specifically, an individual thread can link one or more of its array structures into the common list when an array structure becomes full.

In any event, the FIG. 22 routine returns once the scratch-pad-list entry for a non-popular object has been made. Unless the object thereby referred to becomes popular later in that collection increment, it will be evacuated from the collection set in the normal manner as a result of the just-made scratch-pad-list entry or an entry made for a reference in a younger train.

In the case of a popular object, on the other hand—i.e., in a case in which the block-294 test yields an affirmative result—the thread arranges for special, popular-object-type evacuation of each object that begins in the car-section segment corresponding to the popularity-indicating count value.

In some embodiments, the thread may at this point simply mark the object as needing to be evacuated to a special, single-object car rather than to a normal car. In such a case, the thread would additionally make a scratch-pad entry for the reference, and the referred-to object would be evacuated later, during scratch-pad-list processing. In the illustrated embodiment, though, the object is evacuated immediately.

Such immediate evacuation raises the question of which train the object should be evacuated to. As was mentioned above, a purpose of generating the scratch-pad list is to enable the collection-set objects to be evacuated in reverse train order. This has the benefit of placing an object into the youngest train from which it is referred and thereby minimizing both the number of evacuations and the number of remembered-set entries. In the case of popular objects that are evacuated as part of the operation of processing remembered-set entries rather than as part of the operation of processing scratch-pad-list entries, though, the collector is not following that order; the time of evacuation is determined by when the remembered-set entry-processing thread identifies the object as popular, not by when it reached the first scratch-pad list that identifies a reference to the object. But embodiments that employ the FIG. 22 approach, i.e., that evacuate newly identified popular objects immediately, will usually employ some expedient for avoiding any resultant increase in the number of evacuations and remembered-set entries.

One such expedient, for instance, is to take advantage of "youngest-car indicators." As the collector is adding entries to a remembered set, it will in many cases also update, for the car into which a remembered-set entry is being made, a value that identifies the youngest car from which an object in the remembered set's car is referred. Then, when the early evacuation represented by FIG. 22's block 310 occurs, the train to which the object is evacuated is the one containing the car that the youngest-car indicator identifies. As processing scratch-pad entries in reverse train order does, this minimizes the number of evacuations as well as the size of the remembered set associated with the object's (single-object) car.

Not all embodiments will adopt such an approach, of course. For example, consider the following approach, which is likely to be used by embodiments in which the size of a car-section segment associated with a single count-map entry is greater than the minimum object size. In such an embodiment, the count represented by a count-map entry is not necessarily the count for a single object; it is the sum of the counts for all objects located in the associated car-section segment. A collector may employ such large car-section-segment sizes in order to reduce count-map size. When a count value corresponding to a segment containing more than one object reaches the popular-object threshold in such an embodiment, the collector will not know which object has become popular—or whether any has. Such an embodiment may therefore evacuate each of those objects to respective single-object cars, recognizing that those objects may not actually be popular. Again, the train to which the objects are evacuated could be the one to which the car identified by the youngest-car indicator belongs. But an approach that may be used instead to minimize the resultant "floating garbage" is to evacuate those objects to a relatively "old" train, i.e., to one that is near to collection. This will have the effect of quickly identifying those of the just-evacuated objects that really were not popular and of evacuating (by inexpensive re-linking) the objects that actually are popular.

More specifically, the remembered-set updating represented by FIG. 22's block 280, together with corresponding remembered-set updating that occurs during the scratch-pad-list processing represented by FIG. 19's blocks 232 and 244, will populate the individual remembered sets of the newly evacuated objects' single-car remembered sets. The remembered-set size that results from these operations and any subsequent remembered-set updating will, when those single-object cars come up for collection, yield the appropriate indication of whether their (single-object) contents are popular.

Independently of which approach to popular-object evacuation the collector employs to perform the operation that FIG. 22's block 310 represents, it thereafter returns from the remembered-set-entry-processing operation of FIG. 22 and determines, as FIG. 21's block 272 indicates, whether any entries remain in the remembered-set partition that it is currently processing. If none does, the thread proceeds to the task that block 312 represents: it determines whether all processing has been completed for the remembered set whose partition it has just finished. This determination can be made in any fashion. For example, a thread that completes a partition may update metadata for that partition that indicate whether the partition's processing has been completed. By reading the metadata for all of a given remembered set's partitions, the thread can make the determination that FIG. 21's block 312 represents. Of course, other approaches are possible, too.

If the result of the block-312 test is affirmative—i.e., if the thread finds that all of the current remembered set's entries have been processed—then the thread adds together corresponding counts from all of the count maps that have been maintained for that remembered set by any garbage-collection thread. If any resultant sum exceeds a popular-object threshold—which will typically but not necessarily be the same as the threshold used in the operation that FIG. 22's block 294 represents—the thread uses the above-described approach, as block 314 indicates, to evacuate each object whose header such a segment contains. As the drawing also indicates, the thread omits the block-314 step if the thread determines in the block-312 step that not all of the remembered sets have been processed.

In any event, the thread repeats the steps of the FIG. 21 routine until no remembered-set partition remains.

As is apparent in the foregoing description, the present invention enables a multi-threaded collector to keep track of object popularity without imposing any significant synchronization overhead. It therefore constitutes a significant advance in the art.

What is claimed is:

1. A computer implemented method for performing garbage collection in a multithreaded environment, comprising:
    obtaining a collection set of objects in a computer system, wherein the collection set is associated with a collector interval of a collection cycle;
    partitioning the collection set of objects into a plurality of sections, wherein a section of the plurality of sections corresponds to memory of the computer system and is associated with a remembered set;
    partitioning the section into a plurality of segments, wherein a first segment of the plurality of segments corresponds to a portion of the memory of the computer system;
    obtaining a first count-map for the section, wherein the first count-map is associated with a first thread executing on a processor of the computer system, and wherein a first entry in the first count-map is associated with the first segment of the plurality of segments;
    identifying a first plurality of references to objects in the first segment using the remembered set;
    incrementing the first entry based on a size of the first plurality of references;
    comparing the first entry with a popular-object threshold to generate a first comparison; and
    evacuating a first object from the first segment based on the first comparison to reclaim the portion of the memory of the computer system for reuse.

2. The computer implemented method of claim 1, further comprising:
    obtaining a second count-map for the section, wherein the second count-map is associated with a second thread, and wherein a second entry in the second count-map is associated with the first segment;
    identifying a second plurality of referenced to objects in the first segment using the remembered set;
    incrementing the second entry based on a size of the second plurality of references;
    incrementing the first entry based on the second entry before comparing the first entry with the popular-object threshold.

3. The computer implemented method of claim 1, further comprising:
    obtaining a second count-map for the section, wherein the second count-map is associated with a second thread, and wherein a second entry in the second count-map is associated with a second segment of the plurality of segments;
    identifying a second plurality of references to objects in the second segment using the remembered set;
    incrementing the second entry based on a size of the second plurality of references;
    comparing the second entry with the popular-object threshold to generate a second comparison; and
    evacuating a second object from the second segment based on the second comparison to reclaim memory of the computer system for reuse.

4. The computer implemented method of claim 1, wherein evacuating the first object comprises:
    adding a new section to the plurality of sections; and placing the first object in the new section, wherein the new section is exclusively occupied by the first object.

5. The computer implemented method of claim 3, wherein evacuating the second object comprises:
   adding a new section to the plurality of sections; and
   placing the second object in the new section, wherein the new section is exclusively occupied by the second object.

6. The computer implemented method of claim 1, wherein the popular-object threshold is an individual-map threshold.

7. The computer implemented method of claim 2, wherein the popular-object threshold is a multiple-map threshold.

8. The computer implemented method of claim 1, wherein at least one of the plurality of segments is smaller than a minimum object size.

9. A computer readable medium storing instructions for performing garbage collection in a multithreaded environment, the instructions comprising functionality to:
   obtain a collection set of objects in a computer system, wherein the collection set is associated with a collector interval of a collection cycle;
   partition the collection set of objects into a plurality of sections, wherein a section of the plurality of sections is associated with a remembered set;
   partition the section into a plurality of segments;
   obtain a first count-map for the section, wherein the first count-map is associated with a first thread, and wherein a first entry in the first count-map is associated with a first segment of the plurality of segments;
   identify a first plurality of references to objects in the first segment using the remembered set;
   increment the first entry based on a size of the first plurality of references;
   compare the first entry with a popular-object threshold to generate a first comparison; and
   evacuate a first object from the first segment based on the first comparison to reclaim memory of the computer system for reuse.

10. The computer readable medium of claim 9, the instructions further comprising functionality to:
   obtain a second count-map for the section, wherein the second count-map is associated with a second thread, and wherein a second entry in the second count-map is associated with the first segment;
   identify a second plurality of referenced to objects in the first segment using the remembered set;
   increment the second entry based on a size of the second plurality of references;
   increment the first entry based on the second entry before comparing the first entry with the popular-object threshold.

11. The computer readable medium of claim 9, the instructions further comprising functionality to:
   obtain a second count-map for the section, wherein the second count-map is associated with a second thread, and wherein a second entry in the second count-map is associated with a second segment of the plurality of segments;
   identify a second plurality of references to objects in the second segment using the remembered set;
   increment the second entry based on a size of the second plurality of references;
   compare the second entry with the popular-object threshold to generate a second comparison; and
   evacuate a second object from the second segment based on the second comparison to reclaim memory of the computer system for reuse.

12. The computer readable medium of claim 9, wherein the instructions for evacuating the first object comprise functionality to:
   add a new section to the plurality of sections; and
   place the first object in the new section, wherein the new section is exclusively occupied by the first object.

13. The computer readable medium of claim 11, wherein the instructions for evacuating the second object comprise functionality to:
   add a new section to the plurality of sections; and
   place the second object in the new section, wherein the new section is exclusively occupied by the second object.

14. The computer readable medium of claim 9, wherein the popular-object threshold is an individual-map threshold.

15. The computer readable medium of claim 9, wherein the popular-object threshold is a multiple-map threshold.

16. The computer readable medium of claim 9, wherein at least one of the plurality of segments is smaller than a minimum object size.

17. An apparatus for performing garbage collection in a multithreaded environment, comprising:
   a first means for obtaining a collection set of objects in a computer system, wherein the collection set is associated with a collector interval of a collection cycle;
   a second means for partitioning the collection set of objects into a plurality of sections, wherein a section of the plurality of sections is associated with a remembered set;
   a third means for partitioning the section into a plurality of segments;
   a fourth means for obtaining a count-map for the section, wherein the count-map is associated with a thread, and wherein an entry in the count-map is associated with a segment of the plurality of segments;
   a fifth means for identifying a plurality of references to objects in the segment using the remembered set;
   a sixth means for incrementing the entry based on a size of the plurality of references;
   a seventh means for comparing the entry with a popular-object threshold to generate a comparison; and
   an eighth means for evacuating an object from the segment based on the comparison to reclaim memory of the computer system for reuse;
   wherein a portion of at least one selected from a group consisting of the first means, the second means, the third means, the fourth means, the fifth means, the sixth means, the seventh means, and the eighth means comprises a hardware processor.

* * * * *